United States Patent
Sugano et al.

(10) Patent No.: US 9,194,312 B2
(45) Date of Patent: Nov. 24, 2015

(54) CONTROL UNIT FOR VEHICLE DRIVING DEVICE

(75) Inventors: Kazumitsu Sugano, Toyota (JP);
Hiromitsu Metsugi, Toyota (JP);
Toshiya Oishi, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/378,125

(22) PCT Filed: Feb. 13, 2012

(86) PCT No.: PCT/JP2012/053306
§ 371 (c)(1),
(2), (4) Date: Aug. 12, 2014

(87) PCT Pub. No.: WO2013/121510
PCT Pub. Date: Aug. 22, 2013

(65) Prior Publication Data
US 2015/0012205 A1    Jan. 8, 2015

(51) Int. Cl.
*F02D 41/00* (2006.01)
*B60W 10/06* (2006.01)
(Continued)

(52) U.S. Cl.
CPC ........... *F02D 41/0007* (2013.01); *B60W 10/04* (2013.01); *B60W 10/06* (2013.01); *B60W 10/10* (2013.01); *B60W 10/11* (2013.01); *B60W 30/18009* (2013.01); *F02D 23/00* (2013.01); *F02D 29/02* (2013.01); *F02D 41/045* (2013.01); *F02D 41/10* (2013.01); *F02D 45/00* (2013.01); *F16H 59/32* (2013.01); *F16H 61/061* (2013.01);

(Continued)

(58) Field of Classification Search
CPC ....... F02D 41/00; F02D 41/04; F02D 41/045; F02D 41/0007; B60W 10/10; B60W 10/06
See application file for complete search history.

(56) References Cited

U.S. PATENT DOCUMENTS 5,228,368 A * 7/1993 Kato et al. ..................... 701/103
2014/0330492 A1* 11/2014 Hasegawa et al. ............ 701/102

FOREIGN PATENT DOCUMENTS

| JP | 2-197431 | 8/1990 |
| JP | 9-144572 | 6/1997 |
| JP | 2010-255586 | 11/2010 |

OTHER PUBLICATIONS

International Search Report issued Mar. 27, 2012, in PCT/JP2012/053306, filed Feb. 13, 2012.

*Primary Examiner* — Hieu T Vo
(74) *Attorney, Agent, or Firm* — Oblon, McClelland, Maier & Neustadt, L.L.P.

(57) ABSTRACT

A control device of a vehicle drive device includes an engine having a supercharger and an automatic transmission outputting power of the engine to drive wheels. When an upshift of the automatic transmission is performed by executing an acceleration operation, if a progress status of a supercharging pressure increase in a supercharger pressure increasing process by the supercharger is a status in an initial period of the increasing process, a supercharging pressure increase degree before start of an inertia phase of the upshift is made smaller than a supercharging pressure increase degree after a predetermined timing subsequent to the start of the inertia phase, while if the progress status of the supercharging pressure increase is a status in an ending period of the increasing process, the supercharging pressure increase degree before the start of the inertia phase is made larger than the supercharging pressure increase degree after the predetermined timing.

6 Claims, 11 Drawing Sheets

(51) Int. Cl.

| | |
|---|---|
| *B60W 10/11* | (2012.01) |
| *F16H 59/32* | (2006.01) |
| *F02D 23/00* | (2006.01) |
| *F02D 29/02* | (2006.01) |
| *F02D 41/10* | (2006.01) |
| *F16H 61/06* | (2006.01) |
| *F16H 63/50* | (2006.01) |
| *B60W 30/18* | (2012.01) |
| *B60W 10/04* | (2006.01) |
| *B60W 10/10* | (2012.01) |
| *F02D 45/00* | (2006.01) |
| *F02D 41/04* | (2006.01) |
| *F02D 41/02* | (2006.01) |
| *F16H 61/686* | (2006.01) |
| *B60W 50/06* | (2006.01) |
| *F02B 37/18* | (2006.01) |

(52) U.S. Cl.
CPC .............. *F16H 63/502* (2013.01); *B60W 50/06* (2013.01); *F02B 37/18* (2013.01); *F02D 41/023* (2013.01); *F16H 61/686* (2013.01); *Y02T 10/144* (2013.01)

| | C1 | C2 | B1 | B2 | B3 | F1 |
|---|---|---|---|---|---|---|
| 1st | ○ | | | ◎ | | △ |
| 2nd | ○ | | ○ | | | |
| 3rd | ○ | | | | ○ | |
| 4th | ○ | ○ | | | | |
| 5th | | ○ | | | ○ | |
| 6th | | ○ | ○ | | | |
| R | | | | ○ | ○ | |
| N | | | | | | |

◎ ACTUATED DURING ENGINE BRAKE
△ ACTUATED ONLY DURING DRIVE

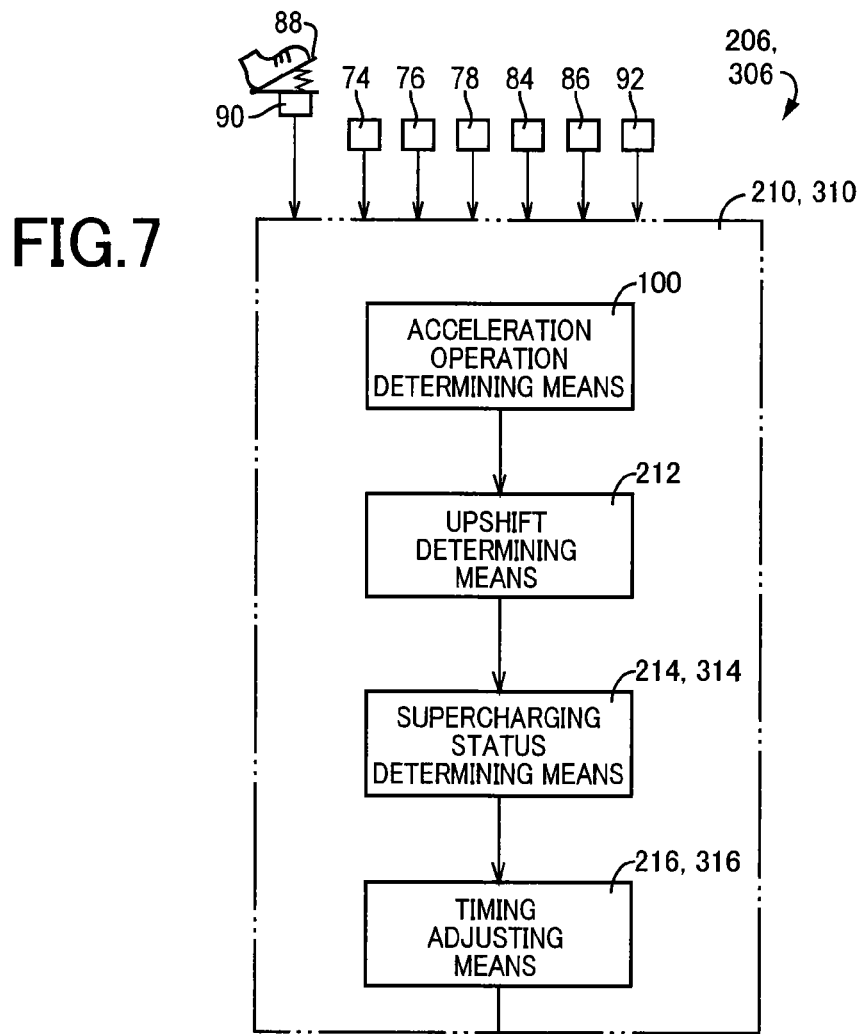
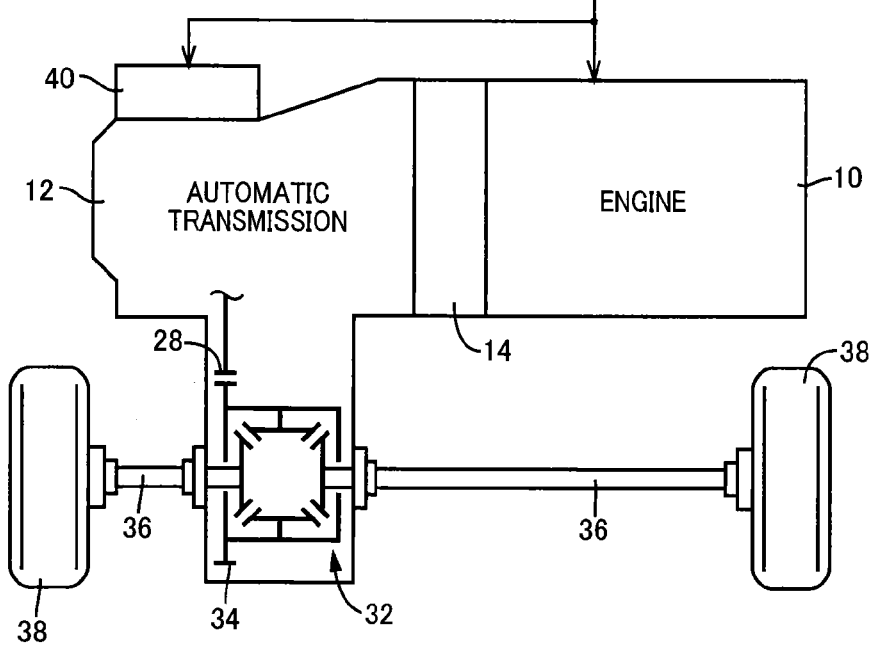
FIG.7

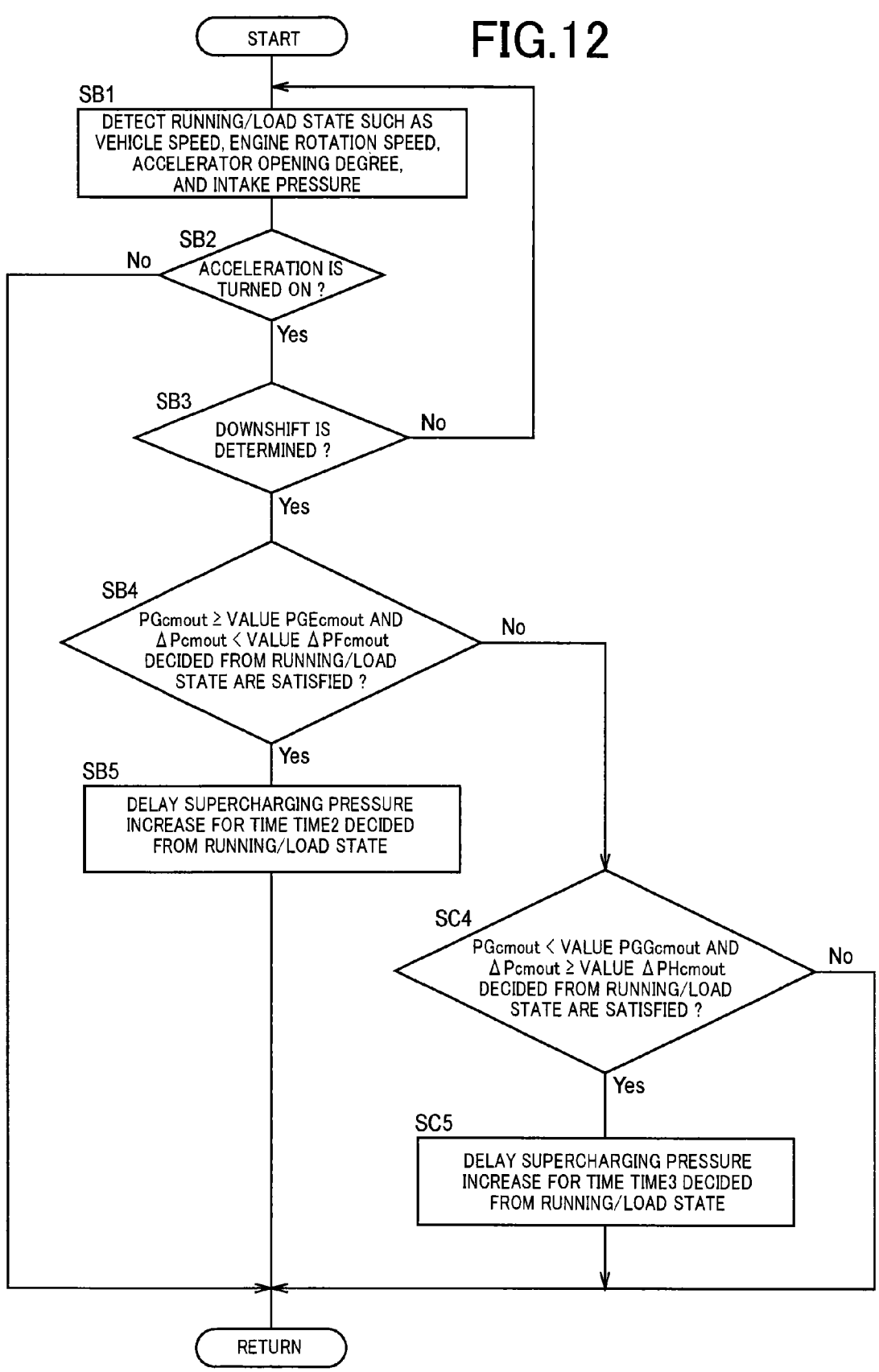

CONTROL UNIT FOR VEHICLE DRIVING DEVICE

TECHNICAL FIELD

The present invention relates to a technique of improving drivability in a vehicle including an engine with a supercharger and an automatic transmission.

BACKGROUND ART

A control device of a vehicle drive device including an engine with a supercharger and an automatic transmission is conventionally well known. For example, this corresponds to a shift control device of Patent Document 1. The shift control device inhibits an upshift of the automatic transmission while a detected supercharging pressure is equal to or less than a supercharging pressure target value and performs the upshift after delaying the upshift until the supercharging pressure increases.

PRIOR ART DOCUMENTS

Patent Documents

Patent Document 1: Japanese Laid-Open Patent Publication No. 2-197431
Patent Document 2: Japanese Laid-Open Patent Publication No. 9-144572
Patent Document 3: Japanese Laid-Open Patent Publication No. 2010-255586

SUMMARY OF THE INVENTION

Problem to be Solved by the Invention

However, when a current supercharging state is in an initial period of a start of supercharging, for example, when a current supercharging pressure is considerably lower than the supercharging pressure target value, if the upshift is performed after waiting for an increase in supercharging pressure, a delay width of delaying the upshift becomes excessively large, which may deteriorate drivability. Such a problem is unknown.

The present invention was conceived in view of the situations and it is therefore an object of the present invention to provide a control device of a vehicle drive device capable of improving drivability in a vehicle drive device including an engine with a supercharger and an automatic transmission.

Means for Solving the Problem

To achieve the object, the first aspect of the invention provides (a) a control device of a vehicle drive device including an engine having a supercharger and an automatic transmission outputting power of the engine to drive wheels, characterized in that (b) when an upshift of the automatic transmission is performed by executing an acceleration operation, if a progress status of a supercharging pressure increase in a supercharger pressure increasing process by the supercharger is a status in an initial period of the increasing process, a supercharging pressure increase degree before start of an inertia phase of the upshift is made smaller than a supercharging pressure increase degree after a predetermined timing subsequent to the start of the inertia phase, while if the progress status of the supercharging pressure increase is a status in an ending period of the increasing process, the supercharging pressure increase degree before the start of the inertia phase is made larger than the supercharging pressure increase degree after the predetermined timing.

Effects of the Invention

Consequently, a shift shock can be suppressed that may occur because of overlap between torque variation of the engine due to an increase in the supercharging pressure and a shift operation of the automatic transmission. Since the termination of the upshift is not delayed when the progress status of the supercharging pressure increase is a status in the initial period of the increasing process, an excessive delay of the termination of the upshift is avoided. As a result, drivability can be improved.

The second aspect of the invention provides the control device of a vehicle drive device recited in the first aspect of the invention, wherein if the progress status of the supercharging pressure increase is a status in the ending period of the increasing process, the inertia phase of the upshift is started after end of the supercharging pressure increase. Consequently, the overlap can be avoided with high certainty between torque variation of the engine due to an increase in the supercharging pressure and a shift operation of the automatic transmission. Thus, the shift shock is easily suppressed.

The third aspect of the invention provides the control device of a vehicle drive device recited in the first or second aspect of the invention, wherein (a) the predetermined timing is a time of termination of the upshift, wherein (b) if the progress status of the supercharging pressure increase is a status in the initial period of the increasing process, the supercharging pressure increase degree before the predetermined timing is made smaller than the supercharging pressure increase degree after the predetermined timing. Consequently, the overlap can be avoided with high certainty between torque variation of the engine due to an increase in the supercharging pressure and a shift operation of the automatic transmission. Thus, the shift shock is easily suppressed.

The fourth aspect of the invention provides the control device of a vehicle drive device recited in any one of the first to third aspects of the invention, wherein (a) the supercharging pressure is increased toward a predefined supercharging pressure target value, and wherein (b) a case when the progress status of the supercharging pressure increase is a status in the initial period of the increasing process, is a case when a deviation amount of the supercharging pressure from the supercharging pressure target value is larger while the supercharging pressure increase degree is smaller, as compared to when the progress status of the supercharging pressure increase is a status in the ending period of the increasing process. Consequently, whether the progress status of the supercharging pressure increase is a status in the initial period and whether the progress status of the supercharging pressure increase is a status in the ending period can easily be decided by detecting the supercharging pressure.

The fifth aspect of the invention provides the control device of a vehicle drive device recited in any one of the first to fourth aspects of the invention, wherein (a) when a downshift of the automatic transmission is performed by executing the acceleration operation, progress of the supercharging pressure increase is suppressed from before start of an inertia phase of the downshift, and wherein (b) contents of control of suppressing the progress of the supercharging pressure increase are switched depending on a progress status of a supercharging pressure increase before the start of the inertia phase.

Consequently, the progress of the supercharging pressure increase can be suppressed without excess or shortage so as to restrain the shift shock.

The sixth aspect of the invention provides the control device of a vehicle drive device recited in the fifth aspect of the invention, wherein when a downshift of the automatic transmission is performed by executing the acceleration operation, and progress of the supercharging pressure increase is suppressed, suppression of the progress is cancelled after termination of the downshift. Consequently, the overlap can be avoided with high certainty between torque variation of the engine due to an increase in the supercharging pressure and a shift operation of the automatic transmission. Thus, the shift shock is easily suppressed.

Preferably, if the progress of the supercharging pressure increase is suppressed when the downshift of the automatic transmission is performed by executing the acceleration operation, a period of suppressing the progress of the supercharging pressure increase is made longer when a change width of the shift ratio is larger between before and after the downshift.

BRIEF DESCRIPTION OF THE DRAWINGS

FIG. 7 is a diagram of exemplary illustration of signals input to the electronic control device for controlling the vehicle drive device of FIG. 1 and is a functional block diagram of the second and third examples for explaining the main portion of a control function included in the electronic control device.

FIG. 12 is a diagram of exemplary illustration of a flowchart combining the flow chart of FIG. 8 and the flow chart of FIG. 10 with each other.

MODE FOR CARRYING OUT THE INVENTION

Examples of the present invention will now be described in detail with reference to the drawings.

First Example

Figures 1, 2:
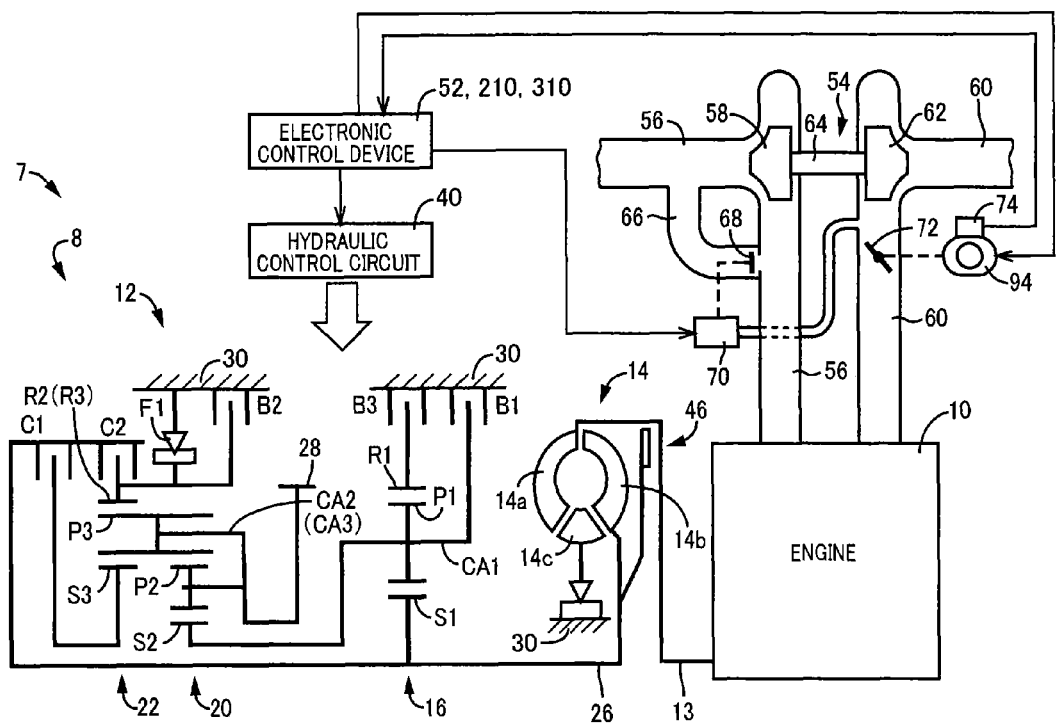
FIG. 1 is a schematic for explaining a configuration of a vehicle drive device included in a vehicle to which the present invention is preferably applied.
FIG. 2 is an operation table for explaining an operation state of engagement elements when a plurality of shift stages (gear stages) is established in an automatic transmission included in the vehicle drive device of FIG. 1.

FIG. 1 is a schematic for explaining a configuration of a vehicle drive device 7 included in a vehicle 6 to which the present invention is preferably applied. The vehicle 6 includes the vehicle drive device 7, a pair of drive wheels 38, etc., and the vehicle drive device 7 includes a vehicle power transmission device 8 (hereinafter referred to as a "power transmission device 8") and an engine 10. The power transmission device 8 is interposed between the engine 10 and the drive wheels 38 and includes an automatic transmission 12 and a torque converter 14 coupled to an output shaft 13 of the engine 10 and interposed between the engine 10 and the automatic transmission 12. The power transmission device 8 is preferably used in an FF vehicle in which the power transmission device 8 is equipped in the lateral direction of (transversely mounted on) the vehicle 6 (see FIG. 3).

The automatic transmission 12 makes up a portion of a power transmission path from the engine 10 to the drive wheels 38 (see FIG. 3) and outputs power of the engine 10 toward the drive wheels 38. Therefore, the power of the engine 10 input to a transmission input shaft 26 is output from an output gear 28 toward the drive wheels 38. The automatic transmission 12 is a stepped transmission including a plurality of planetary gear devices 16, 20, 22, a plurality of hydraulic friction engagement devices (clutches C and brakes B), or specifically, five hydraulic friction engagement devices (C1, C2, B1, B2, B3), and a one-way clutch F1, and selectively establishing a plurality of shift stages (gear stages) by switching any of the multiple hydraulic friction engagement devices to be gripped. For example, the automatic transmission 12 performs a shift in accordance with a relationship (shift diagram) set in advance based on a vehicle state represented by a vehicle speed V and an accelerator opening degree Acc. In short, the automatic transmission 12 is a stepped transmission performing a so-called clutch-to-clutch shift frequently used in typical vehicles. Specifically, the first planetary gear device 16 of the automatic transmission 12 is of a single pinion type and includes a first sun gear S1, a first pinion gear P1, a first carrier CA1, and a first ring gear R1. The second planetary gear device 20 is of a double pinion type and includes a second sun gear S2, a second pinion gear P2, a third pinion gear P3, a second carrier CA2, and a second ring gear R2. The third planetary gear device 22 is of a single pinion type and includes a third sun gear S3, the third pinion gear P3, a third carrier CA3, and a third ring gear R3. The second planetary gear device 20 and the third planetary gear device 22 are formed as a Ravigneaux type planetary gear train with the second and third ring gears R2 and R3 made up of a common member and the third pinion gear P3 of the third planetary gear device 22 used also as one of the pinion gears of the second planetary gear device 20. As can be seen from FIG. 1, the transmission input shaft 26 acting as an input rotating member of the automatic transmission 12 is a turbine shaft of the torque converter 14. The output gear 28 acting as an output rotating member of the automatic transmission 12 functions as a differential drive gear meshed with a differential driven gear (large diameter gear) 34 of a differential gear device 32 (see FIG. 3). An output of the engine 10 is transmitted through the torque converter 14, the automatic transmission 12, the differential gear device 32, and a pair of axles 36 to the pair of the drive wheels (front wheels) 38 (see FIG. 3). The automatic transmission 12 is substantially symmetrically configured relative to a center line and the lower half from the center line is not depicted in FIG. 1.

FIG. 2 is an operation table for explaining an operation state of engagement elements when a plurality of shift stages (gear stages) is established in the automatic transmission 12. The operation table of FIG. 2 summarizes a relationship between the shift stages and the operation state of the clutches C1, C2, and the brakes B1 to B3 with "circles" indicative of engagement, a "double circle" indicative of engagement only during engine brake, and a "triangle" indicative of engagement only during drive. As depicted in FIG. 2, the automatic transmission 12 has six forward shift stages from a first speed gear stage "1st" to a sixth speed gear stage "6th" and a reverse shift stage of a reverse shift stage "R" established depending on the operation state of the engagement elements (the clutches C1, C2, and the brakes B1 to B3). Since the one-way clutch F1 is disposed in parallel with the brake B2 establishing the first shift stage "1st", the brake B2 may not necessarily be engaged at startup (at the time of acceleration). A shift ratio γat of the automatic transmission 12 is calculated based on an input rotation speed Nin that is a rotation speed Nin of the transmission input shaft 26 and an output rotation speed Nout that is a rotation speed Nout of the output gear 28 from an equation "shift ratio γat=input rotation speed Nin/output rotation speed Nout".

The clutches C1, C2, and the brakes B1 to B3 (hereinafter simply referred to as clutches C and brakes B if not particularly distinguished) are hydraulic friction engagement devices subjected to engagement control by hydraulic actuators, such as multiplate clutches and brakes, and have engaged and released states switched, and transient oil pressures at the time of engagement and release controlled, by excitation/non-excitation and current control of a linear solenoid valve disposed in a hydraulic control circuit 40 (see FIG. 1).

The torque converter 14 includes a pump impeller 14a coupled to the output shaft (crankshaft) 13 of the engine 10, a turbine impeller 14b coupled to the transmission input shaft 26 of the automatic transmission 12, and a stator impeller 14c coupled via the one-way clutch to a housing (transmission case) 30 of the automatic transmission 12 and is a fluid transmission device transmitting drive force generated by the engine 10 through fluid to the automatic transmission 12. A lockup clutch 46 is a direct clutch disposed between the pump impeller 14a and the turbine impeller 14b and is put into an engaged state, a slip state, or a released state through hydraulic control etc. The lockup clutch 46 is put into an engaged state, or strictly, a completely engaged state, to integrally rotate the pump impeller 14a and the turbine impeller 14b.

The engine 10 is an internal combustion engine such as a diesel engine or a gasoline engine, and includes a supercharger 54. The supercharger 54 is disposed in an intake system of the engine 10 and is a known exhaust turbine supercharger, i.e., a turbocharger, rotationally driven by exhaust of the engine 10 to pressurize intake air of the engine 10. Specifically, as depicted in FIG. 1, the supercharger 54 includes an exhaust turbine wheel 58 disposed in an exhaust pipe 56 of the engine 10 and rotationally driven by exhaust of the engine 10, an intake compressor wheel 62 disposed in an intake pipe 60 of the engine 10 and rotated by the exhaust turbine wheel 58 to compress intake air of the engine 10, and a rotation shaft 64 coupling the exhaust turbine wheel 58 and the intake compressor wheel 62. When the exhaust of the engine 10 sufficient for driving the supercharger 54 is led to the exhaust turbine wheel 58, the engine 10 operates in a supercharged state in which the engine 10 is supercharged by the supercharger 54. On the other hand, if the exhaust of the engine 10 led to the exhaust turbine wheel 58 is insufficient for driving the supercharger 54, the supercharger 54 is almost not driven and the engine 10 operates in a state of supercharging suppressed as compared to the supercharged state, i.e., a natural aspiration state (also referred to as NA state), which is a state of intake air equivalent to a natural aspirated engine without the supercharger 54.

Additionally, an exhaust bypass path 66 is disposed in parallel with an exhaust path in which the exhaust turbine wheel 58 in the exhaust pipe 56 is disposed, and a waste gate valve 68 is disposed that opens and closes the exhaust bypass path 66. The waste gate valve 68 has an opening degree θwg of the waste gate valve 68 made continuously adjustable (hereinafter referred to as a waste gate valve opening degree θwg), and an electronic control device 52 controls an electric actuator 70 to continuously open and close the waste gate valve 68 by utilizing pressure in the intake pipe 60. For example, when the waste gate valve opening degree θwg is larger, the exhaust of the engine 10 is more easily discharged through the exhaust bypass path 66 and, therefore, in the supercharged state of the engine 10, a downstream air pressure PLin of the intake compressor wheel 62 in the intake pipe 60, i.e., a supercharging pressure Pcmout (=PLin) of the supercharger 54, becomes lower when the waste gate valve opening degree θwg is larger. Therefore, the waste gate valve 68 acts as a supercharging pressure adjusting device adjusting the supercharging pressure Pcmout. As is generally known, the supercharging pressure Pcmout of the supercharger 54 becomes lower when an opening degree θth of an electronic throttle valve 72, i.e., a throttle opening degree θth, is smaller in the supercharged state of the engine 10. The electronic throttle valve 72 is a valve mechanism disposed downstream side of the intake compressor wheel 62 in the intake pipe 60 of the engine 10 to adjust an intake air amount of the engine 10 and is actuated to open/close by an electric throttle actuator 94. Unless otherwise noted, the waste gate valve 68 is assumed to be in a completely closed state in the description of this example.

Figure 3:
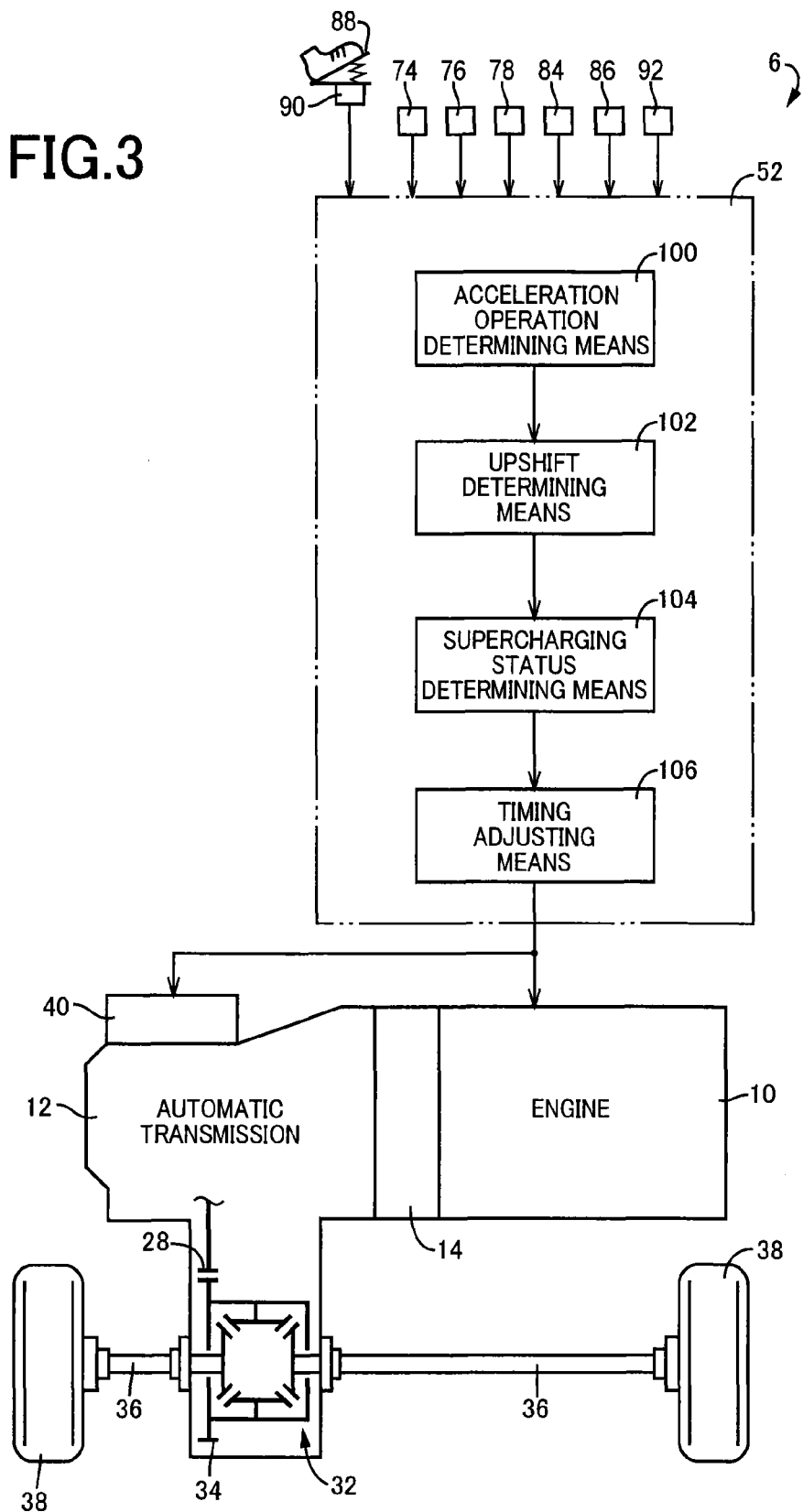
FIG. 3 is a diagram of exemplary illustration of signals input to an electronic control device for controlling the vehicle drive device of FIG. 1 and is a functional block diagram of the first example for explaining a main portion of a control function included in the electronic control device.

FIG. 3 is a diagram of exemplary illustration of signals input to the electronic control device 52 acting as a control device for controlling the vehicle drive device 7 of this example and is a functional block diagram for explaining a main portion of a control function included in the electronic control device 52. The electronic control device 52 includes a so-called microcomputer and executes signal processes in accordance with programs stored in advance to provide vehicle control related to the engine 10 and the automatic transmission 12.

The electronic control device 52 is supplied, from sensors, switches, etc. as depicted in FIG. 3, with a signal indicative of a throttle opening degree θth of the engine 10 detected by a throttle opening degree sensor 74, a signal indicative of an upstream air pressure PHin of the intake compressor wheel 62 in the intake pipe 60 detected by a first intake sensor 76, a signal indicative of the downstream air pressure PLin (=supercharging pressure Pcmout) of the intake compressor wheel 62 in the intake pipe 60 detected by a second intake sensor (supercharging pressure sensor) 78, a signal indicative of an engine rotation speed Ne detected by an engine rotation speed sensor 84, a signal indicative of a rotation speed Nout of the output gear 28 detected by an output rotation speed sensor 86, a signal from an accelerator opening degree sensor 90 indicative of the accelerator opening degree Acc that is an operation amount of an accelerator pedal 88 corresponding to a request output of a driver, a signal from a turbine rotation speed sensor 92 indicative of a rotation speed Nt of the turbine impeller 14b (hereinafter referred to as "turbine rotation speed Nt"), i.e., a rotation speed Nin (=Nt) of the transmission input shaft 26, etc. Since the rotation speed Nout of the output gear 28 corresponds to the vehicle speed V, the output rotation speed sensor 86 also acts as a vehicle speed sensor detecting the vehicle speed V. Since the compressor upstream intake pressure PHin is the same as an atmospheric pressure Pair, the first intake sensor 76 also acts as an atmospheric pressure sensor detecting the atmospheric pressure Pair.

The electronic control device 52 supplies various output signals to the devices disposed on the vehicle 6. For example, the electronic control device 52 sequentially calculates a target engine torque Tet that is a target value of an engine torque Te from a relationship empirically set in advance based on the accelerator opening degree Acc, the vehicle speed V, the engine rotation speed Ne, etc. The electronic control device 52 provides throttle control for adjusting the throttle opening degree θth through the electric throttle actuator 94 so that the engine torque Te attains the target engine torque Tet, i.e., the engine torque Te matches the target engine torque Tet. The electronic control device 52 basically increases the throttle opening degree θth as the accelerator opening degree Acc increases in the throttle control.

If an upshift of the automatic transmission 12 is performed by executing an acceleration operation such as depressing the accelerator pedal 88, i.e., if a power-on upshift is performed that is an upshift during vehicle acceleration, the supercharging pressure Pcmout increases due to the acceleration operation. If the power-on upshift is performed, the electronic control device 52 of this example provides control of adjusting a temporal relative relationship between progress of a supercharging pressure increase in a process of increasing the supercharging pressure Pcmout by the supercharger 54 and an inertia phase start timing of the upshift depending on a supercharging status of the supercharger before start of the inertia phase of the upshift, so as to suppress a shift shock that may occur because of overlap between torque variation of the engine 10 due to an increase in the supercharging pressure Pcmout and a shift operation of the automatic transmission 12. A main portion of the control function will be described with reference to FIG. 3.

As depicted in FIG. 3, the electronic control device 52 functionally includes an acceleration operation determining means 100 that is an acceleration operation determining portion, an upshift determining means 102 that is an upshift determining portion, a supercharging status determining means 104 that is a supercharging status determining portion, and a timing adjusting means 106 that is a timing adjusting portion.

The acceleration operation determining means 100 determines whether an acceleration operation is executed by a driver. In other words, it is determined whether the vehicle 6 is during acceleration running. The acceleration operation means that, for example, a driver depresses the accelerator pedal 88 and, therefore, for example, the acceleration operation determining means 100 sequentially detects the accelerator opening degree Acc and determines that the acceleration operation is executed if the accelerator opening degree Acc exceeds a predetermined accelerator opening degree determination value.

The upshift determining means 102 determines whether an upshift of the automatic transmission 12 is performed by executing the acceleration operation, or in short, whether the power-on upshift is performed. Whether the acceleration operation is executed is dependent on the determination of the acceleration operation determining means 100. Specifically, the electronic control device 52 makes a shift determination of performing a shift of the automatic transmission 12 based on the vehicle speed V and the accelerator opening degree Acc from the predefined shift diagram and performs a shift of the automatic transmission 12 after making the shift determination in accordance with the shift determination and, therefore, for example, the upshift determining means 102 determines that the upshift of the automatic transmission 12 is performed if the shift determination of performing the upshift of the automatic transmission 12 is made from the shift diagram.

The supercharging status determining means 104 sequentially detects a progress status of the supercharging pressure increase in the increasing process of the supercharging pressure Pcmout. In short, the supercharging status determining means 104 sequentially detects a supercharging status of the supercharger 54. The progress status of the supercharging pressure increase, i.e., the supercharging status, may be represented by combining some or all of the supercharging pressure Pcmout, the engine torque Te, a load factor of the engine 10, and a temporal change rate thereof, the progress status is represented in this example by the supercharging pressure Pcmout and a temporal increase rate ΔPcmout of the supercharging pressure Pcmout (hereinafter referred to as a supercharging pressure temporal increase rate ΔPcmout). Therefore, in this example, detecting the supercharging status (the progress status of the supercharging pressure increase) is to detect the supercharging pressure Pcmout and calculate (or detect) the temporal increase rate of the supercharging pressure Pcmout. If the upshift determining means 102 determines that the power-on upshift is performed, the supercharging status determining means 104 determines whether the supercharging status at the time of the shift determination of performing the power-on upshift, i.e., an upshift determination time supercharging status, is an initial supercharging status empirically set in advance so as to represent an initial period of supercharging pressure increase in the process of increasing the supercharging pressure Pcmout. In other words, it is determined whether the progress status of the supercharging pressure increase at the time of the shift determination is a status at an initial period in the increasing process of the supercharging pressure Pcmout (corresponding to the initial supercharging status). The supercharging pressure temporal increase rate ΔPcmout is an increase width of the supercharging pressure Pcmout per unit time and is also referred to as a supercharging pressure increase degree ΔPcmout.

The electronic control device 52 sequentially defines a supercharging pressure target value PTcmout (target supercharging pressure PTcmout) from a relationship empirically defined in advance such that the engine torque Te requested by a driver is acquired, based on the accelerator opening degree Acc, the vehicle speed V, etc., and adjusts the throttle opening degree θth to increase or decrease the supercharging pressure Pcmout toward the predefined target supercharging pressure PTcmout. Therefore, in this example, the initial supercharging status is defined as a status of supercharging in which a deviation amount of the supercharging pressure Pcmout from the target supercharging pressure PTcmout, i.e., a supercharging pressure deviation amount PGcmout (=PTcmout−Pcmout), is equal to or greater than an initial supercharging pressure deviation amount determination value PGAcmout empirically set in advance while the supercharging pressure temporal increase rate ΔPcmout is smaller than an initial supercharging pressure temporal increase rate determination value ΔPBcmout empirically set in advance. Therefore, the supercharging status determining means 104 determines that the upshift determination time supercharging status is the initial supercharging status if the supercharging pressure deviation amount PGcmout in the upshift determination time supercharging status, i.e., the supercharging pressure deviation amount PGcmout at the time of the shift determination, is equal to or greater than the initial supercharging pressure deviation amount determination value PGAcmout while the supercharging pressure temporal increase rate ΔPcmout in the upshift determination time supercharging status, i.e., the supercharging pressure temporal increase rate ΔPcmout at the time of the shift determination, is smaller than the initial supercharging pressure temporal increase rate determination value ΔPBcmout. The initial supercharging pressure deviation amount determination value PGAcmout and the initial supercharging pressure temporal increase rate determination value ΔPBcmout are parameters (determination values) empirically set in advance so as to represent the initial period of supercharging pressure increase in the process of increasing the supercharging pressure Pcmout. Although both the initial supercharging pressure deviation amount determination value PGAcmout and the initial supercharging pressure temporal increase rate determination value ΔPBcmout may be constant values, since the process of increasing the supercharging pressure Pcmout is affected by a temporal change rate of the accelerator opening degree Acc, the engine rotation speed Ne, and the atmospheric pressure Pair, the initial supercharging pressure deviation amount determination value PGAcmout and the initial supercharging pressure temporal increase rate determination value ΔPBcmout are preferably sequentially decided based on the temporal change rate of the accelerator opening degree Acc, the engine rotation speed Ne, and/or the atmospheric pressure Pair at the time of determination (detection) of the supercharging pressure deviation amount PGcmout and the supercharging pressure temporal increase rate ΔPcmout to be compared, for example, at the time of the shift determination. Although the supercharging pressure deviation amount PGcmout and the supercharging pressure temporal increase rate ΔPcmout compared with the determination values PGAcmout and ΔPBcmout are values at the time of the shift determination, the values may be those after the time of the shift determination and before the start of the inertia phase of the upshift and may be, for example, those at the start of the shift when the actuation of the clutches C or the brakes B is started for the upshift.

As a result of determining whether the upshift determination time supercharging status is the initial supercharging status, if it is determined that the status is not the initial supercharging status, the supercharging status determining means 104 determines whether the upshift determination time supercharging status is an ending supercharging status empirically set in advance so as to represent an ending period of supercharging pressure increase in the process of increasing the supercharging pressure Pcmout. In other words, it is determined whether the progress status of the supercharging pressure increase at the time of the shift determination is a status of an ending period in the increasing process of the supercharging pressure Pcmout (corresponding to the ending supercharging status). In this example, the ending supercharging status is defined as a status of supercharging in which the supercharging pressure deviation amount PGcmout is smaller than an ending supercharging pressure deviation amount determination value PGCcmout empirically set in advance while the supercharging pressure temporal increase rate ΔPcmout is equal to or greater than an ending supercharging pressure temporal increase rate determination value ΔPDcmout empirically set in advance. Therefore, the supercharging status determining means 104 determines that the upshift determination time supercharging status is the ending supercharging status if the supercharging pressure deviation amount PGcmout at the time of the shift determination is smaller than the ending supercharging pressure deviation amount determination value PGCcmout while the supercharging pressure temporal increase rate ΔPcmout at the time of the shift determination is equal to or greater than the ending supercharging pressure temporal increase rate determination value ΔPDcmout. The ending supercharging pressure deviation amount determination value PGCcmout and the ending supercharging pressure temporal increase rate determination value ΔPDcmout are parameters (determination values) empirically set in advance so as to represent the ending period of supercharging pressure increase in the process of increasing the supercharging pressure Pcmout. Although the ending supercharging pressure deviation amount determination value PGCcmout and the ending supercharging pressure temporal increase rate determination value ΔPDcmout may be constant values as is the case with the determination values PGAcmout and ΔPBcmout, the determination values PGCcmout and ΔPDcmout are preferably sequentially decided based on the temporal change rate of the accelerator opening degree Acc, the engine rotation speed Ne, and/or the atmospheric pressure Pair at the time of determination (detection) of the supercharging pressure deviation amount PGcmout and the supercharging pressure temporal increase rate ΔPcmout to be compared, for example, at the time of the shift determination. Since a range of the initial supercharging status and a range of the ending supercharging status do not overlap with each other when using the supercharging pressure deviation amount PGcmout and the supercharging pressure temporal increase rate ΔPcmout as parameters, for example, the ending supercharging pressure deviation amount determination value PGCcmout is set to the same value as the initial supercharging pressure deviation amount determination value PGAcmout or to a value smaller than the determination value PGAcmout, and the ending supercharging pressure temporal increase rate determination value ΔPDcmout is set to the same value as the initial supercharging pressure temporal increase rate determination value ΔPBcmout or to a value larger than the determination value ΔPBcmout. Although the supercharging pressure deviation amount PGcmout and the supercharging pressure temporal increase rate ΔPcmout compared with the determination values PGCcmout and ΔPDcmout are values at the time of the shift determination, the values may be those after the time of the shift determination and before the start of the inertia phase of the upshift and may be, for example, those at the start of the shift.

If an upshift of the automatic transmission 12 is performed by executing an acceleration operation, i.e., if the power-on upshift is performed, the timing adjusting means 106 adjusts the temporal relative relationship between the progress of the supercharging pressure increase in the process of increasing the supercharging pressure Pcmout by the supercharger 54 and the inertia phase start timing of the upshift depending on a supercharging status of the supercharger 54 before start of the inertia phase of the upshift. In particular, in the adjustment of the temporal relative relationship, if the supercharging status before the start of the inertia phase is a status on the initial period side of progress of the supercharging pressure increase, first supercharging pressure increase progress suppression control is provided to suppress the progress of the supercharging pressure increase as compared to when the adjustment is not performed. On the other hand, if the supercharging status before the start of the inertia phase is a status on the ending period side of progress of the supercharging pressure increase, upshift delay control is provided to delay the inertia phase start timing of the upshift as compared to when the adjustment is not performed. When the supercharging status before the start of the inertia phase is a status on the initial period side of progress of the supercharging pressure increase, this specifically means that the supercharging status determining means 104 determines that the supercharging status at the time of the shift determination, i.e., the upshift determination time supercharging status, is the initial supercharging status. When the supercharging status before the start of the inertia phase is a status on the ending period side of progress of the supercharging pressure increase, this specifically means that the supercharging status determining means 104 determines that the upshift determination time supercharging status is the ending supercharging status.

Specifically, in the first supercharging pressure increase progress suppression control, the timing adjusting means 106 suppresses the progress of the supercharging pressure increase from the time of the shift determination of the upshift to the time of termination of the upshift (=the time of termination of the inertia phase) as compared to when the first supercharging pressure increase progress suppression control is not provided. In other words, the timing adjusting means 106 delays the progress of the supercharging pressure increase. If the progress of the supercharging pressure increase is suppressed, the suppression of the progress is canceled in conformity with the termination of the upshift or after the termination of the upshift. In short, the first supercharging pressure increase progress suppression control is terminated in conformity with the termination of the upshift or after the termination of the upshift. Terminating the first supercharging pressure increase progress suppression control in conformity with the termination of the upshift means not only terminating the first supercharging pressure increase progress suppression control at the same time with the termination of the upshift but also terminating the first supercharging pressure increase progress suppression control within a range of a temporal difference before and after termination that can be determined as being substantially synchronized with the termination of the upshift. In the first supercharging pressure increase progress suppression control, the timing adjusting means 106 adjusts, for example, the waste gate valve opening degree θwg to suppress the progress of the supercharging pressure increase.

For example, the timing adjusting means 106 may sequentially detect the progress status of the upshift from a change in the engine rotation speed Ne to define a time point at which the first supercharging pressure increase progress suppression control is terminated; however, since a time (shift time) required for a shift of the automatic transmission 12 is defined in advance from a running load state (that may simply be referred to as a running state) represented by the vehicle speed V, the accelerator opening degree Acc, the supercharging pressure Pcmout, the engine rotation speed Ne etc., the timing adjusting means 106 in this example decides a first control provision duration time TIME1 of providing the first supercharging pressure increase progress suppression control such that the first supercharging pressure increase progress suppression control is terminated in conformity with the termination of the upshift or after the termination of the upshift, based on the running load state at the time of the shift determination from a relationship (map) empirically set in advance, for example. The timing adjusting means 106 provides the first supercharging pressure increase progress suppression control from the time of the shift determination until the first control provision duration time TIME1 elapses. In this way, the timing adjusting means 106 terminates the first supercharging pressure increase progress suppression control in conformity with the termination of the upshift or after the termination of the upshift. Although the timing adjusting means 106 of this example adjusts the waste gate valve opening degree θwg to retain the supercharging pressure Pcmout at the time of the shift determination during provision of the first supercharging pressure increase progress suppression control, the timing adjusting means 106 may gradually increase the supercharging pressure Pcmout at a predetermined temporal increase rate to the extent that a shift shock is not enlarged at the upshift.

In the upshift delay control, the timing adjusting means 106 delays the inertia phase start timing of the upshift as compared to when the upshift delay control is not provided and, specifically, the timing adjusting means 106 delays the inertia phase start timing of the upshift until end of an increase in the supercharging pressure Pcmout. Therefore, if the inertia phase start timing of the upshift is delayed, the inertia phase of the upshift is started after end of the increase in the supercharging pressure Pcmout. In short, the upshift delay control is terminated after end of the increase in the supercharging pressure Pcmout. The end of the increase in the supercharging pressure Pcmout means that the supercharging pressure Pcmout reaches the target supercharging pressure PTcmout and, for example, if the supercharging pressure Pcmout enters a predetermined pressure range in which it can be determined that the target supercharging pressure PTcmout is reached and which includes the target supercharging pressure PTcmout, it is determined that the supercharging pressure Pcmout reaches the target supercharging pressure PTcmout.

For example, the timing adjusting means 106 may sequentially detect the supercharging pressure Pcmout to sequentially determine whether the supercharging pressure Pcmout reaches the target supercharging pressure PTcmout, thereby deciding the inertial phase start timing at the time of provision of the upshift delay control. However, since a time required for the supercharging pressure Pcmout to reach the target supercharging pressure PTcmout can empirically be obtained in advance based on the running load state, the timing adjusting means 106 in this example decides a shift start delay time TIMEds of delaying the inertia phase start timing in the upshift delay control as compared to when the upshift delay control is not provided, such that the upshift delay control is terminated as early as possible after end of an increase in the supercharging pressure Pcmout, based on the running load state at the time of the shift determination from a relationship (map) empirically set in advance, for example. The timing adjusting means 106 starts the upshift delay control from the time of the shift determination, delays the inertia phase start timing for the shift start delay time TIMEds in the upshift delay control, and terminates the upshift delay control as the inertia phase of the upshift starts. In this way, the timing adjusting means 106 terminates the upshift delay control after end of the increase in the supercharging pressure Pcmout.

Figure 4:
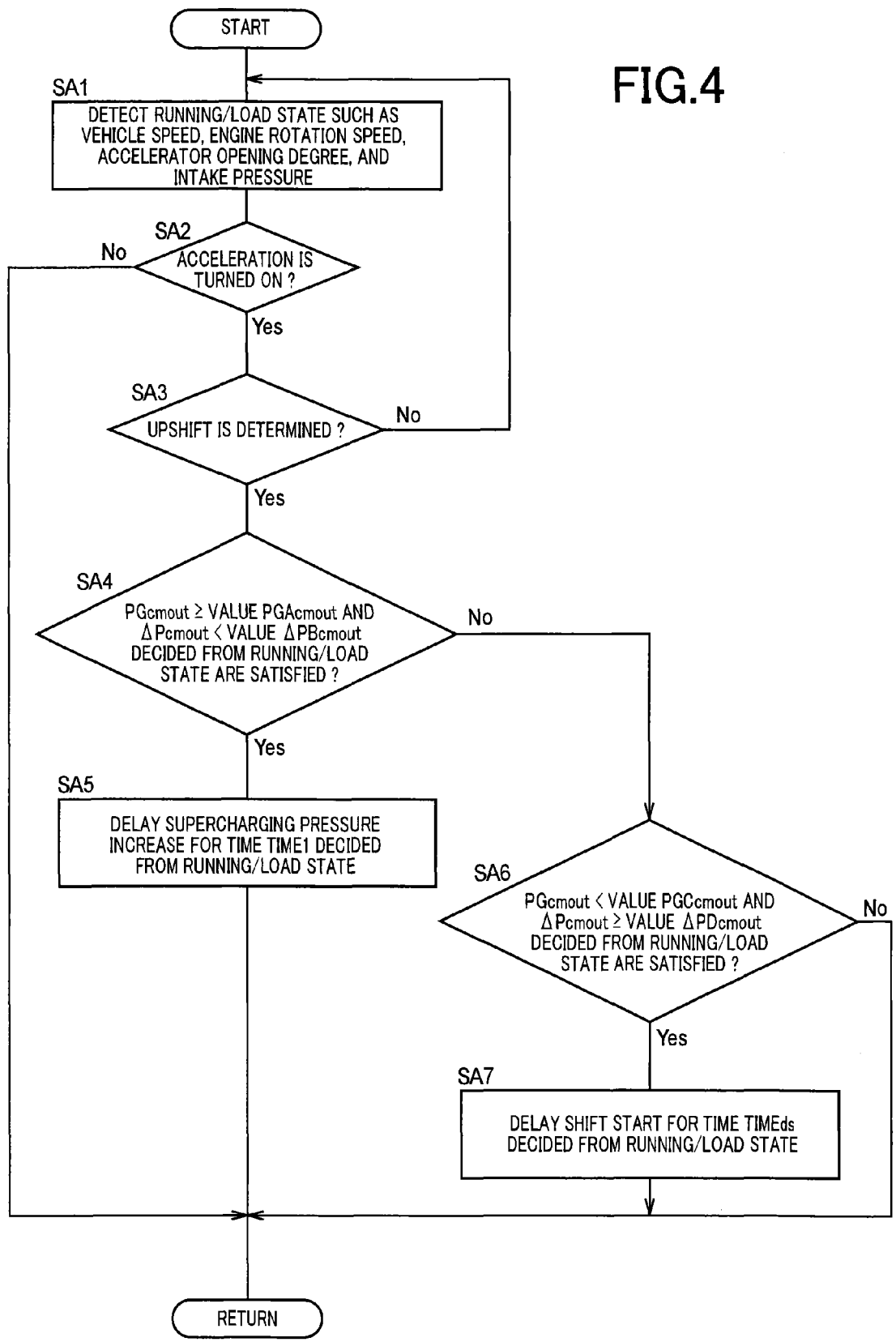
FIG. 4 is a flowchart of the first example for explaining a main portion of a control operation of the electronic control device of FIG. 3, i.e., a flowchart for explaining a control operation of adjusting a temporal relative relationship between progress of an supercharging pressure increase and an inertia phase start timing of an upshift when a power-on upshift is performed.

FIG. 4 is a flowchart for explaining a main portion of a control operation of the electronic control device 52, i.e., a control operation of adjusting the temporal relative relationship between the progress of the supercharging pressure increase and the inertia phase start timing of the upshift when the power-on upshift is performed, and is repeatedly executed with an extremely short cycle time, for example, on the order of a few msec to a few tens of msec. The control operation depicted in FIG. 4 is performed solely or concurrently with another control operation.

First, at step (hereinafter, "step" will be omitted) SA1, the vehicle speed V, the accelerator opening degree Acc, the supercharging pressure Pcmout (=intake pressure), the engine rotation speed Ne etc. are detected and acquired. In short, the running load state is detected. SA1 is followed by SA 2. SA1 corresponds to the acceleration operation determining means 100, the upshift determining means 102, the supercharging status determining means 104, and the timing adjusting means 106.

At SA2 corresponding to the acceleration operation determining means 100, it is determined whether an acceleration operation is executed by a driver. The acceleration operation means that the accelerator pedal 88 is depressed, for example. If the determination of SA2 is affirmative, i.e., if the acceleration operation is executed, the operation goes to SA3. On the other hand, if the determination of SA2 is negative, this flowchart is terminated. If the determination of SA2 is affirmative, the accelerator pedal 88 is depressed to turn on acceleration and, therefore, the engine 10 is in the supercharged state.

At SA3 corresponding to the upshift determining means 102, it is determined whether an upshift of the automatic transmission 12 is performed, i.e., whether shift determination of the upshift is made. If the determination of SA3 is affirmative, i.e., if the upshift is performed, the operation goes to SA4. On the other hand, if the determination of SA3 is negative, the operation goes to SA1.

At SA4 corresponding to the supercharging status determining means 104, it is determined whether the supercharging pressure deviation amount PGcmout at the time of the shift determination is equal to or greater than the initial supercharging pressure deviation amount determination value PGAcmout while the supercharging pressure temporal increase rate ΔPcmout at the time of the shift determination is smaller than the initial supercharging pressure temporal increase rate determination value ΔPBcmout. If the determination of SA4 is affirmative, i.e., if the supercharging pressure deviation amount PGcmout at the time of the shift determination is equal to or greater than the initial supercharging pressure deviation amount determination value PGAcmout while the supercharging pressure temporal increase rate ΔPcmout at the time of the shift determination is smaller than the initial supercharging pressure temporal increase rate determination value ΔPBcmout, the operation goes to SA5. On the other hand, if the determination of SA4 is negative, the operation goes to SA6.

At SA5 corresponding to the timing adjusting means 106, the first supercharging pressure increase progress suppression control is provided. Specifically, in the first supercharging pressure increase progress suppression control, the progress of the supercharging pressure increase is suppressed for the first control provision duration time TIME1 decided based on the running load state. For example, a supercharging pressure increase is delayed for the first control provision duration time TIME1.

At SA6 corresponding to the supercharging status determining means 104, it is determined whether the supercharging pressure deviation amount PGcmout at the time of the shift determination is smaller than the ending supercharging pressure deviation amount determination value PGCcmout while the supercharging pressure temporal increase rate ΔPcmout at the time of the shift determination is equal to or greater than the ending supercharging pressure temporal increase rate determination value ΔPDcmout. If the determination of SA6 is affirmative, i.e., if the supercharging pressure deviation amount PGcmout at the time of the shift determination is smaller than the ending supercharging pressure deviation amount determination value PGCcmout while the supercharging pressure temporal increase rate ΔPcmout at the time of the shift determination is equal to or greater than the ending supercharging pressure temporal increase rate determination value ΔPDcmout, the operation goes to SA7. On the other hand, the determination of SA6 is negative, this flowchart is terminated.

At SA7 corresponding to the timing adjusting means 106, the upshift delay control is provided. For example, in the upshift delay control, the shift start of the upshift, or specifically, the start of the inertia phase is delayed for the shift start delay time TIMEds decided based on the running load state.

Figure 5:
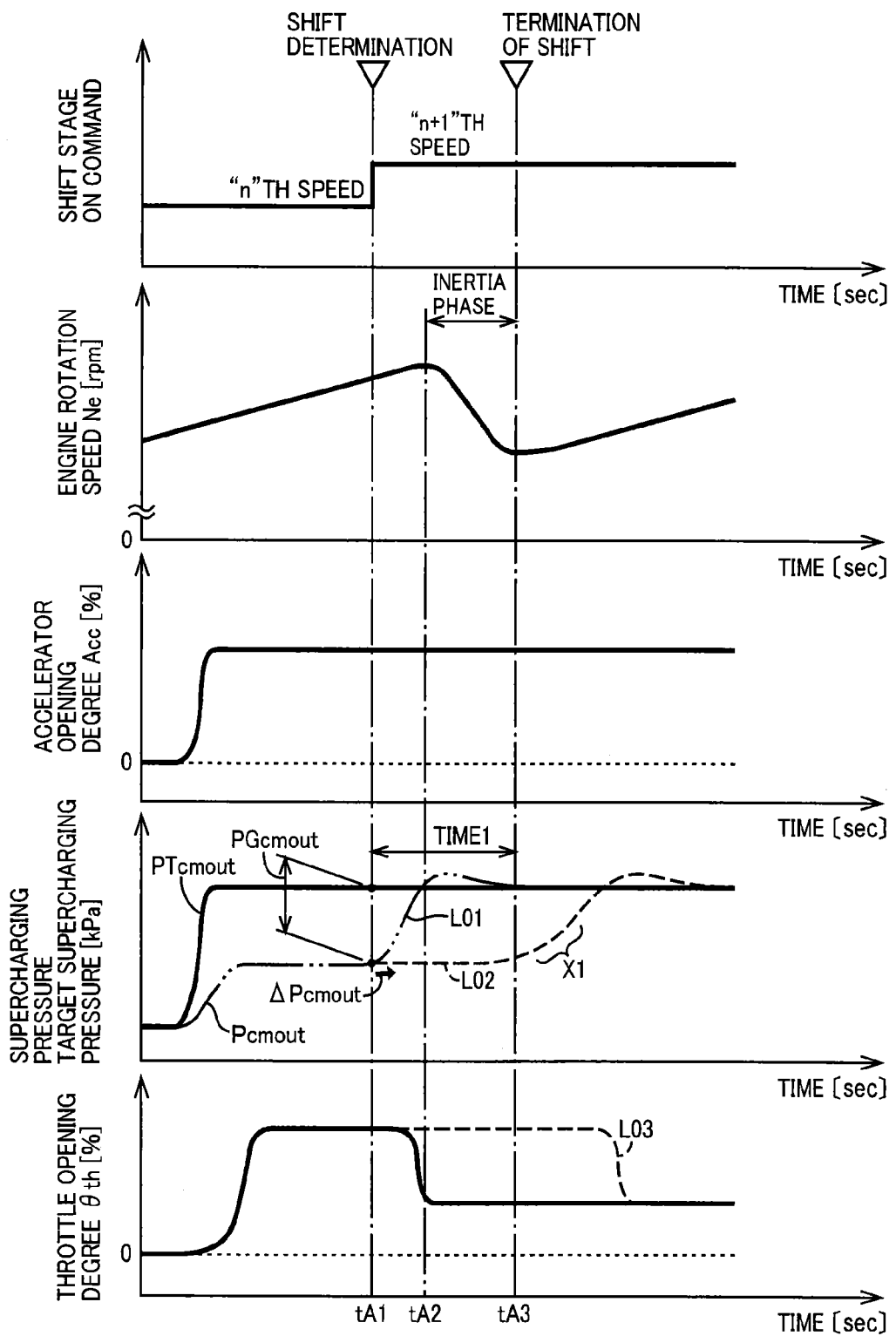
FIG. 5 is a first time chart for explaining the flowchart of FIG. 4 in the first example, i.e., a time chart for explaining first supercharging pressure increase progress suppression control by taking as an example the case of performing the power-on upshift from an "n"th speed to an "n+1"th speed.

FIG. 5 is a time chart for explaining the first supercharging pressure increase progress suppression control by taking as an example the case of performing the power-on upshift from an "n"th speed to an "n+1"th speed. An upshift of the automatic transmission 12 performed in FIG. 5, for example, shows as a shift from 3rd to 4th speed in the automatic transmission 12, is a shift performed by switching the clutches C or the brakes B to be gripped included in the automatic transmission 12, i.e., the clutch-to-clutch shift. Since the vehicle 6 is accelerated in FIG. 5, the engine rotation speed Ne increases as time elapses except the inertial phase of the shift of the automatic transmission 12. In the time charts of the supercharging pressure Pcmout and the target supercharging pressure PTcmout, a solid line indicates the target supercharging pressure PTcmout and a dashed-two dotted line L01 or a broken line L02 indicates the supercharging pressure Pcmout.

The accelerator opening degree Acc is increased before time tA1 of FIG. 5 and, as a result, the target supercharging pressure PTcmout is raised so as to promptly increase the engine torque Te. Since the supercharging pressure deviation amount PGcmout is enlarged by the raise of the target supercharging pressure PTcmout, the throttle opening degree θth is increased to bring the supercharging pressure Pcmout closer to the target supercharging pressure PTcmout. At time tA1, a shift determination is made for performing an upshift of the automatic transmission 12. Therefore, at time tA1, the determination of SA3 of FIG. 4 is affirmative and the determination of SA4 is made. Both the supercharging pressure deviation amount PGcmout and the supercharging pressure temporal increase rate ΔPcmout compared with the determination values at SA4 are values at time tA1 (at the time of the shift determination), for example, and the determination of SA4 is affirmative in the example of FIG. 5.

Since the determination of SA4 of FIG. 4 is affirmative at time tA1 of FIG. 5, the execution step of the flowchart of FIG. 4 goes to SA5 at time tA1, and the provision of the first supercharging pressure increase progress suppression control is started from time tA1. Time tA2 of FIG. 5 is a time of start of the inertia phase of the upshift and time tA3 is a time of termination of the inertia phase, i.e., a time of termination of the upshift.

In FIG. 5, if the first supercharging pressure increase progress suppression control is not provided, the supercharging pressure Pcmout increases as indicated by the dashed-two dotted line L01 of FIG. 5; however, since the provision of the first supercharging pressure increase progress suppression control is started from time tA1, the progress of the increase in the supercharging pressure Pcmout is suppressed from time tA1 until the first control provision duration time TIME1 elapses. For example, as indicated by the broken line L02 of FIG. 5, the provision of the first supercharging pressure increase progress suppression control retains the supercharging pressure Pcmout at the amplitude of time tA1 from time tA1 to time tA3, and the first supercharging pressure increase progress suppression control is terminated at time tA3 so that the supercharging pressure Pcmout is increased from time tA3. As described above, if the determination of SA4 of FIG. 4 is affirmative, i.e., if the progress status of the supercharging pressure increase at time tA1 is a status in the initial period of the increasing process of the supercharging pressure Pcmout, the electronic control device 52 provides the first supercharging pressure increase progress suppression control to make the supercharging pressure temporal increase rate ΔPcmout before start of the inertia phase of the upshift smaller than the supercharging pressure temporal increase rate ΔPcmout (see a portion X1 of FIG. 5) after a predetermined timing (corresponding to time tA3) subsequent to the start of the inertial phase, as indicated by the broken line L02. The first supercharging pressure increase progress suppression control may be terminated in conformity with the termination of the upshift, i.e., the supercharging pressure Pcmout may start increasing immediately before time tA3.

Although the supercharging pressure Pcmout normally increases as indicated by the dashed-two dotted line L01 in FIG. 5, the provision of the first supercharging pressure increase progress suppression control suppresses the progress of the supercharging pressure increase as indicated by the broken line L02 and the supercharging pressure Pcmout reaches the target supercharging pressure PTcmout at a time point delayed in association with the suppression of the progress as compared to the dashed-two dotted line L01 and, therefore, the throttle opening degree θth is lowered at a time point delayed as indicated by a broken line L03 as compared to a solid line.

Although the upshift of FIG. 5 is a shift of one stage, the upshift may be a skip shift of two or more stages and, if the upshift is the skip shift, the shift time becomes longer as compared to the shift of one stage and, therefore, the first control provision duration time TIME1 is set longer as compared to the shift of one stage. Therefore, if the progress of the supercharging pressure increase is suppressed when the power-on upshift is performed, i.e., if the first supercharging pressure increase progress suppression control is provided, a period of suppressing the progress of the supercharging pressure increase, i.e., the first control provision duration time TIME1 is made longer when a change width of the shift ratio γat is larger between before and after the upshift.

Figure 6:
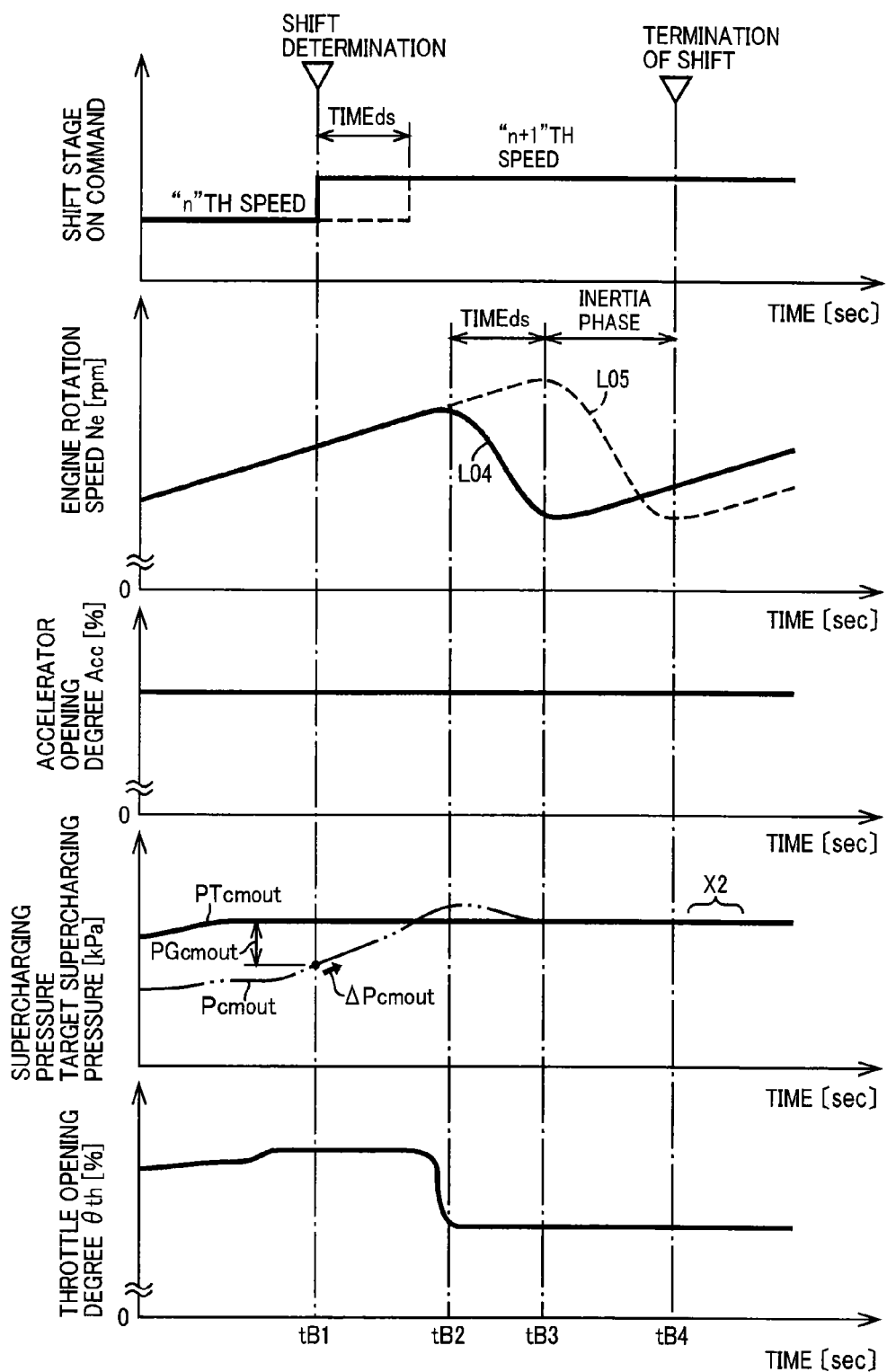
FIG. 6 is a second time chart for explaining the flowchart of FIG. 4 in the first example, i.e., a time chart for explaining upshift delay control by taking as an example the case of performing the power-on upshift from an "n"th speed to an "n+1"th speed.

FIG. 6 is a time chart for explaining the upshift delay control by taking as an example the case of performing the power-on upshift from an "n"th speed to an "n+1"th speed. An upshift of the automatic transmission 12 performed in FIG. 6 is the clutch-to-clutch shift as is the case with the example of FIG. 5. Since the vehicle 6 is accelerated also in FIG. 6, the engine rotation speed Ne increases as time elapses except the inertial phase of the shift of the automatic transmission 12. In the time charts of the supercharging pressure Pcmout and the target supercharging pressure PTcmout, a solid line indicates the target supercharging pressure PTcmout and a dashed-two dotted line indicates the supercharging pressure Pcmout.

The accelerator opening degree Acc is increased before time tB1 of FIG. 6 and, as a result, the target supercharging pressure PTcmout is raised so as to promptly increase the engine torque Te. Since the supercharging pressure deviation amount PGcmout is enlarged by the raise of the target supercharging pressure PTcmout, the throttle opening degree θth is increased to bring the supercharging pressure Pcmout closer to the target supercharging pressure PTcmout. At time tB1, a shift determination is made for performing an upshift of the automatic transmission 12. Therefore, at time tB1, the determination of SA3 of FIG. 4 is affirmative and the determination of SA4 is made. Both the supercharging pressure deviation amount PGcmout and the supercharging pressure temporal increase rate ΔPcmout compared with the determination values at SA4 and SA6 of FIG. 4 are values at time tB1 (at the time of the shift determination), for example, and unlike the example of FIG. 5, the determination of SA4 is negative and the determination of SA6 is affirmative in the example of FIG. 6.

Since the determination of SA6 of FIG. 4 is affirmative at time tB1 of FIG. 6, the execution step of the flowchart of FIG. 4 goes to SA7 at time tB1, and the provision of the upshift delay control is started from time tB1. Time tB2 of FIG. 6 is a time of start of the inertia phase of the upshift if the upshift delay control is not provided and, in other words, a time of start of the inertia phase before provision of the upshift delay control. Time tB3 is a time of start of the inertia phase if the upshift delay control is provided, and time tB4 is a time of termination of the upshift if the upshift delay control is provided.

In FIG. 6, if the upshift delay control is not provided, the inertia phase start timing of the upshift is time tB2 and the engine rotation speed Ne starts decreasing from time tB2 as indicated by a solid line L04; however, since the inertia phase start timing is delayed by the upshift delay control for the shift start delay time TIMEds to time tB3, the engine rotation speed Ne starts decreasing from time tB3 as indicated by a broken line L05. The increasing supercharging pressure Pcmout converges to the target supercharging pressure PTcmout before time tB3. In other words, the increase in the supercharging pressure Pcmout is terminated before time tB3. Therefore, if the determination of SA6 of FIG. 4 is affirmative, i.e., if the progress status of the supercharging pressure increase at time tB1 is a status in the ending period of the increasing process of the supercharging pressure Pcmout, the electronic control device 52 provides the upshift delay control to make the supercharging pressure temporal increase rate ΔPcmout before start of the inertia phase of the upshift (before time tB3) larger than the supercharging pressure temporal increase rate ΔPcmout (see a portion X2 of FIG. 6) after a predetermined timing (corresponding to time tB4) subsequent to the start of the inertial phase, as indicated by a dashed-two dotted line of the time chart of the supercharging pressure Pcmout. From FIG. 6, it can be said that the inertia phase of the upshift is started after end of the increase in the supercharging pressure Pcmout due to the provision of the upshift delay control.

This example has the following effects (A1) to (A6). (A1) According to this example, when the power-on upshift is performed, if the progress status of the supercharging pressure increase is a status in the initial period of the increasing process of the supercharging pressure Pcmout, i.e., if the determination of SA4 of FIG. 4 is affirmative, the electronic control device 52 makes the supercharging pressure temporal increase rate ΔPcmout (supercharging pressure increase degree ΔPcmout) before start of the inertia phase of the upshift smaller than the supercharging pressure temporal increase rate ΔPcmout (see the portion X1 of FIG. 5) after a predetermined timing (corresponding to time tA3 of FIG. 5) subsequent to the start of the inertial phase, as indicated by the broken line L02 of FIG. 5. On the other hand, if the progress status of the supercharging pressure increase is a status in the ending period of the increasing process of the supercharging pressure Pcmout, i.e., if the determination of SA6 of FIG. 4 is affirmative, the electronic control device 52 makes the supercharging pressure temporal increase rate ΔPcmout before start of the inertia phase of the upshift (before time tB3 of FIG. 6) larger than the supercharging pressure temporal increase rate ΔPcmout (see the portion X2 of FIG. 6) after the predetermined timing (corresponding to time tB4 of FIG. 6), as indicated by the dashed-two dotted line of the time chart of the supercharging pressure Pcmout of FIG. 6. Therefore, the electronic control device 52 can suppress a shift shock that may occur because of overlap between torque variation of the engine 10 due to an increase in the supercharging pressure Pcmout and a shift operation of the automatic transmission 12. Since the termination of the upshift is not delayed when the progress status of the supercharging pressure increase is a status in the initial period of the increasing process, an excessive delay of the termination of the upshift is avoided. As a result, drivability can be improved.

(A2) According to this example, when the power-on upshift is performed, if the progress status of the supercharging pressure increase is a status in the ending period of the increasing process of the supercharging pressure Pcmout, or in short, if the determination of SA6 of FIG. 4 is affirmative, the electronic control device 52 starts the inertia phase of the upshift after end of the increase in the supercharging pressure Pcmout. Therefore, the overlap can be avoided with high certainty between torque variation of the engine 10 due to an increase in the supercharging pressure Pcmout and a shift operation of the automatic transmission 12. Thus, the shift shock is easily suppressed.

(A3) According to this example, as depicted in the time chart of FIG. 5, when the power-on upshift is performed, if the progress status of the supercharging pressure increase is a status in the initial period of the increasing process of the supercharging pressure Pcmout, or in short, if the determination of SA4 of FIG. 4 is affirmative, the electronic control device 52 makes the supercharging pressure temporal increase rate ΔPcmout (supercharging pressure increase degree ΔPcmout) before termination of the upshift smaller than the supercharging pressure temporal increase rate ΔPcmout after the time of termination of the upshift. Therefore, the overlap can be avoided with high certainty between torque variation of the engine 10 due to an increase in the supercharging pressure Pcmout and a shift operation of the automatic transmission 12. Thus, the shift shock is easily suppressed. The predetermined timing of the present invention corresponds to the time of termination of the upshift in this example.

(A4) According to this example, for example, the ending supercharging pressure deviation amount determination value PGCcmout is set to the same value as the initial supercharging pressure deviation amount determination value PGAcmout or a value smaller than the determination value PGAcmout and the ending supercharging pressure temporal increase rate determination value ΔPDcmout is set to the same value as the initial supercharging pressure temporal increase rate determination value ΔPBcmout or a value larger than the determination value ΔPBcmout. Therefore, when the progress status of the supercharging pressure increase is a status in the initial period of the increasing process of the supercharging pressure Pcmout, the supercharging pressure deviation amount PGcmout is larger and the supercharging pressure temporal increase rate ΔPcmout (supercharging pressure increase degree ΔPcmout) is smaller as compared to when the progress status of the supercharging pressure increase is a status in the ending period of the increasing process of the supercharging pressure Pcmout. As a result, whether the progress status of the supercharging pressure increase is a status in the initial period and whether the progress status of the supercharging pressure increase is a status in the ending period can easily be decided by detecting the supercharging pressure Pcmout.

(A5) According to this example, whether the progress of the supercharging pressure increase is suppressed by the first supercharging pressure increase progress suppression control and whether the inertia phase start timing of the upshift is delayed by the upshift delay control are decided based on the supercharging status after the time of the shift determination of the upshift. Therefore, for example, if the accelerator pedal 88 is returned before it is decided that the upshift is performed, unnecessary suppression of the progress of the supercharging pressure increase is avoided, and unnecessary delay of the inertia phase start timing is avoided.

(A6) According to this example, the first control provision duration time TIME1 and the shift start delay time TIMEds are decided based on the running load state at the time of the shift determination of the upshift from the respective relationships (maps) empirically set in advance. Therefore, the first control provision duration time TIME1 and the shift start delay time TIMEds can properly be decided with a light control load.

Another example of the present invention will be described. In the following description, the portions mutually common to the examples are denoted by the same reference numerals and will not be described.

Second Example

Although a vehicle 206 of this example (second example) depicted in FIG. 7 is different from the vehicle 6 of the first example in that an electronic control device 210 is included instead of the electronic control device 52, the vehicle 206 is the same as the vehicle 6 of the first example except this point.

FIG. 7 is a functional block diagram for explaining a main portion of a control function included in the electronic control device 210 of this example. As depicted in FIG. 7, the electronic control device 210 includes the acceleration operation determining means 100 as is the case with the electronic control device 52 of the first example. Unlike the first example, the electronic control device 210 functionally includes a downshift determining means 212 that is a downshift determining portion, a supercharging status determining means 214 that is a supercharging status determining portion, and a timing adjusting means 216 that is a timing adjusting portion.

The downshift determining means 212 determines whether a downshift of the automatic transmission 12 is performed by executing the acceleration operation, or in short, whether a power-on downshift is performed. Whether the acceleration operation is executed is dependent on the determination of the acceleration operation determining means 100. For example, the downshift determining means 212 determines that the downshift of the automatic transmission 12 is performed if a shift determination of performing the downshift of the automatic transmission 12 is made from the shift diagram.

As is the case with the supercharging status determining means 104 of the first example, the supercharging status determining means 214 sequentially detects a progress status of a supercharging pressure increase in an increasing process of the supercharging pressure Pcmout. In short, the supercharging status determining means 214 sequentially detects a supercharging status of the supercharger 54. If the downshift determining means 212 determines that the power-on downshift is performed, the supercharging status determining means 214 determines whether the supercharging status at the time of the shift determination of performing the power-on downshift, i.e., a downshift determination time supercharging status is an initial supercharging status empirically set in advance so as to represent an initial period of supercharging pressure increase in the process of increasing the supercharging pressure Pcmout. For example, in this example, the initial supercharging status is defined as a status of supercharging in which the supercharging pressure deviation amount PGcmout (=PTcmout−Pcmout) is equal to or greater than an initial supercharging pressure deviation amount determination value PGEcmout empirically set in advance while the supercharging pressure temporal increase rate ΔPcmout is smaller than an initial supercharging pressure temporal increase rate determination value ΔPFcmout empirically set in advance. Therefore, the supercharging status determining means 214 determines that the downshift determination time supercharging status is the initial supercharging status if the supercharging pressure deviation amount PGcmout in the downshift determination time supercharging status, i.e., the supercharging pressure deviation amount PGcmout at the time of the shift determination, is equal to or greater than the initial supercharging pressure deviation amount determination value PGEcmout while the supercharging pressure temporal increase rate ΔPcmout in the downshift determination time supercharging status, i.e., the supercharging pressure temporal increase rate ΔPcmout at the time of the shift determination, is smaller than the initial supercharging pressure temporal increase rate determination value ΔPFcmout. Although the initial supercharging pressure deviation amount determination value PGEcmout may be a value different from the initial supercharging pressure deviation amount determination value PGAcmout of the first example, the initial supercharging pressure deviation amount determination value PGEcmout is set to the same value in this example. Although the initial supercharging pressure temporal increase rate determination value ΔPFcmout may be a value different from the initial supercharging pressure temporal increase rate determination value ΔPBcmout of the first example, the initial supercharging pressure temporal increase rate determination value ΔPFcmout is set to the same value in this example. The initial supercharging pressure deviation amount determination value PGEcmout and the initial supercharging pressure temporal increase rate determination value ΔPFcmout are parameters (determination values) set for the same purpose as the initial supercharging pressure deviation amount determination value PGAcmout and the initial supercharging pressure temporal increase rate determination value ΔPBcmout of the first example. As is the case with the initial supercharging pressure deviation amount determination value PGAcmout and the initial supercharging pressure temporal increase rate determination value ΔPBcmout of the first example, although the initial supercharging pressure deviation amount determination value PGEcmout and the initial supercharging pressure temporal increase rate determination value ΔPFcmout of this example may be constant values, the initial supercharging pressure deviation amount determination value PGEcmout and the initial supercharging pressure temporal increase rate determination value ΔPFcmout are preferably sequentially decided based on the temporal change rate of the accelerator opening degree Acc, the engine rotation speed Ne, and/or the atmospheric pressure Pair at the time of determination (detection) of the supercharging pressure deviation amount PGcmout and the supercharging pressure temporal increase rate ΔPcmout to be compared, for example, at the time of the shift determination. Although the supercharging pressure deviation amount PGcmout and the supercharging pressure temporal increase rate ΔPcmout compared with the determination values PGEcmout and ΔPFcmout are values at the time of the shift determination, the values may be those after the time of the shift determination and before the start of the inertia phase of the downshift and may be, for example, those at the start of the shift when the actuation of the clutches C or the brakes B is started for the downshift.

If a downshift of the automatic transmission 12 is performed by executing an acceleration operation, i.e., if the power-on downshift is performed, the timing adjusting means 216 adjusts the temporal relative relationship between the progress of the supercharging pressure increase in the process of increasing the supercharging pressure Pcmout by the supercharger 54 and the inertia phase start timing of the downshift depending on a supercharging status of the supercharger 54 before the start of the inertia phase of the downshift. In particular, in the adjustment of the temporal relative relationship, if the supercharging status before the start of the inertia phase is a status on the initial period side of progress of the supercharging pressure increase, a second supercharging pressure increase progress suppression control is provided to suppress the progress of the supercharging pressure increase as compared to when the adjustment is not performed. When the supercharging status before the start of the inertia phase is a status on the initial period side of progress of the supercharging pressure increase, this specifically means that the supercharging status determining means 214 determines that the supercharging status at the time of the shift determination, i.e., the downshift determination time supercharging status, is the initial supercharging status. In the first example, if the supercharging status before the start of the inertia phase is a status on the ending period side of progress of the supercharging pressure increase, the inertia phase start timing is delayed; however, in the case of this example, i.e., if the power-on downshift is performed, the inertia phase start timing is not delayed. This is because, in the case of the power-on downshift, if the shift is delayed, acceleration responsiveness deteriorates and the drivability is likely to be impaired.

Specifically, in the second supercharging pressure increase progress suppression control, the timing adjusting means 216 suppresses the progress of the supercharging pressure increase from the time of the shift determination of the downshift to the time of termination of the downshift (=the time of termination of the inertia phase) as compared to when the second supercharging pressure increase progress suppression control is not provided. In other words, the timing adjusting means 216 delays the progress of the supercharging pressure increase. If the progress of the supercharging pressure increase is suppressed, the suppression of the progress is canceled in conformity with the termination of the downshift or after the termination of the downshift. In short, the second supercharging pressure increase progress suppression control is terminated in conformity with the termination of the downshift or after the termination of the downshift. In the second supercharging pressure increase progress suppression control, as is the case with the first supercharging pressure increase progress suppression control of the first example, the timing adjusting means 216 adjusts, for example, the waste gate valve opening degree θwg to suppress the progress of the supercharging pressure increase.

For example, as is the case with the timing adjusting means 106 of the first example, the timing adjusting means 216 may sequentially detect the progress status of the downshift from a change in the engine rotation speed Ne to define a time point at which the second supercharging pressure increase progress suppression control is terminated; however, in this example, the timing adjusting means 216 decides a second control provision duration time TIME2 of providing the second supercharging pressure increase progress suppression control such that the second supercharging pressure increase progress suppression control is terminated in conformity with the termination of the downshift or after the termination of the downshift, based on the running load state at the time of the shift determination from a relationship (map) empirically set in advance, for example. The timing adjusting means 216 provides the second supercharging pressure increase progress suppression control from the time of the shift determination until the second control provision duration time TIME2 elapses. In this way, the timing adjusting means 216 terminates the second supercharging pressure increase progress suppression control in conformity with the termination of the downshift or after the termination of the downshift. Although the timing adjusting means 216 of this example adjusts the waste gate valve opening degree θwg to retain the supercharging pressure Pcmout at the time of the shift determination during provision of the second supercharging pressure increase progress suppression control, the timing adjusting means 216 may gradually increase the supercharging pressure Pcmout at a predetermined temporal increase rate to the extent that a shift shock is not enlarged at the downshift. As compared to the first supercharging pressure increase progress suppression control of the first example, the second supercharging pressure increase progress suppression control of this example may be configured with the same control contents or may be different in the supercharging pressure temporal increase rate ΔPcmout during provision of the control and/or the timing of control termination etc.

Figure 8:
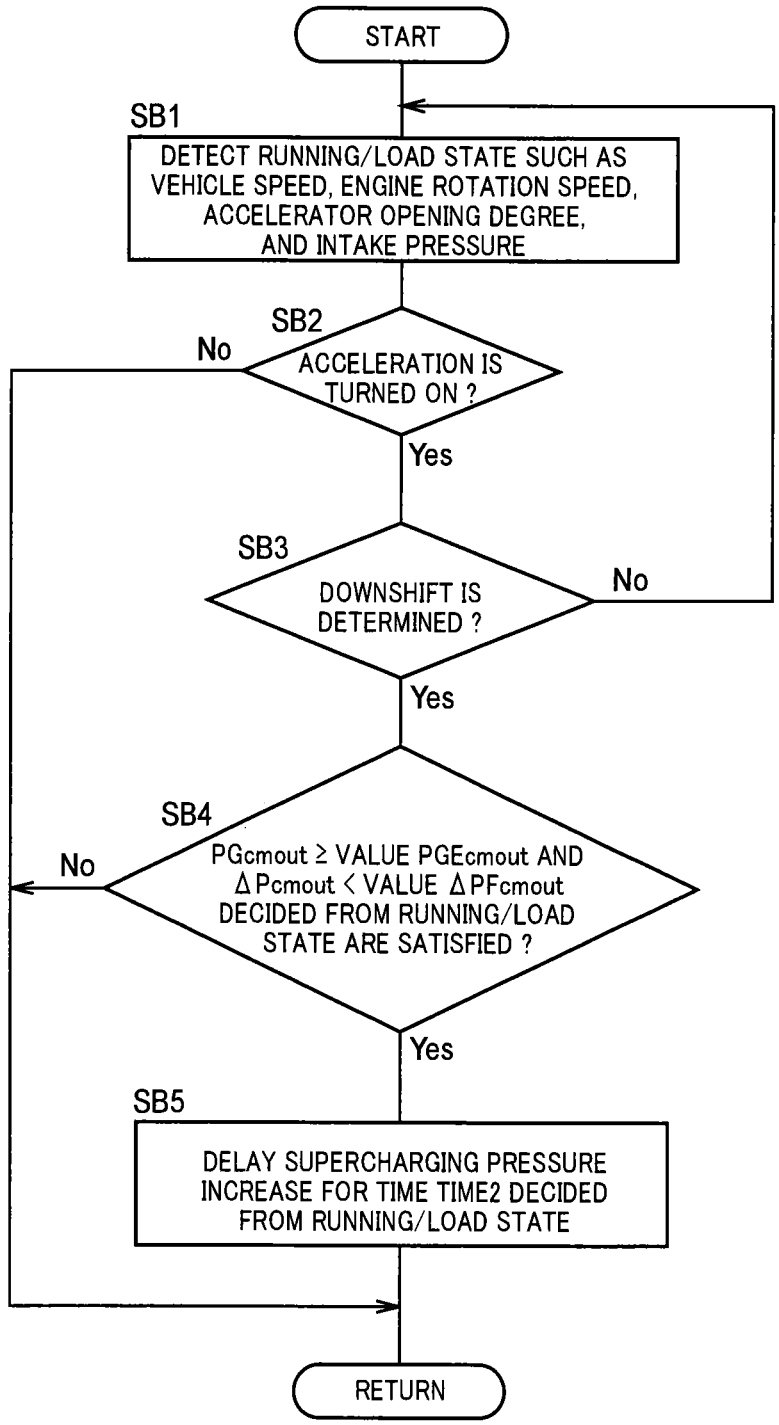
FIG. 8 is a flowchart of the second example for explaining a main portion of a control operation of the electronic control device of FIG. 7, i.e., a flowchart for explaining a control operation of providing second supercharging pressure increase progress suppression control when a power-on downshift is performed.

FIG. 8 is a flowchart for explaining a main portion of a control operation of the electronic control device 210, i.e., a control operation of providing the second supercharging pressure increase progress suppression control when the power-on downshift is performed, and is repeatedly executed with an extremely short cycle time, for example, on the order of a few msec to a few tens of msec. The control operation depicted in FIG. 8 is performed solely or concurrently with another control operation. SB1 and SB2 of FIG. 8 are the same as SA1 and SA2, respectively, of FIG. 4 and, therefore, SB1 and SB2 will not be described.

In FIG. 8, if the determination of SB2 is affirmative, the operation goes to SB3. At SB3 corresponding to the downshift determining means 212, it is determined whether a downshift of the automatic transmission 12 is performed, i.e., whether a shift determination of the downshift is made. If the determination of SB3 is affirmative, i.e., if the downshift is performed, the operation goes to SB4. On the other hand, if the determination of SB3 is negative, the operation goes to SB1.

At SB4 corresponding to the supercharging status determining means 214, it is determined whether the supercharging pressure deviation amount PGcmout at the time of the shift determination is equal to or greater than the initial supercharging pressure deviation amount determination value PGEcmout while the supercharging pressure temporal increase rate ΔPcmout at the time of the shift determination is smaller than the initial supercharging pressure temporal increase rate determination value ΔPFcmout. If the determination of SB4 is affirmative, i.e., if the supercharging pressure deviation amount PGcmout at the time of the shift determination is equal to or greater than the initial supercharging pressure deviation amount determination value PGEcmout while the supercharging pressure temporal increase rate ΔPcmout at the time of the shift determination is smaller than the initial supercharging pressure temporal increase rate determination value ΔPFcmout, the operation goes to SB5. On the other hand, if the determination of SB4 is negative, this flowchart is terminated.

At SB5 corresponding to the timing adjusting means 216, the second supercharging pressure increase progress suppression control is provided. Specifically, in the second supercharging pressure increase progress suppression control, the progress of the supercharging pressure increase is suppressed for the second control provision duration time TIME2 decided based on the running load state. For example, a supercharging pressure increase is delayed for the second control provision duration time TIME2.

Figure 9:
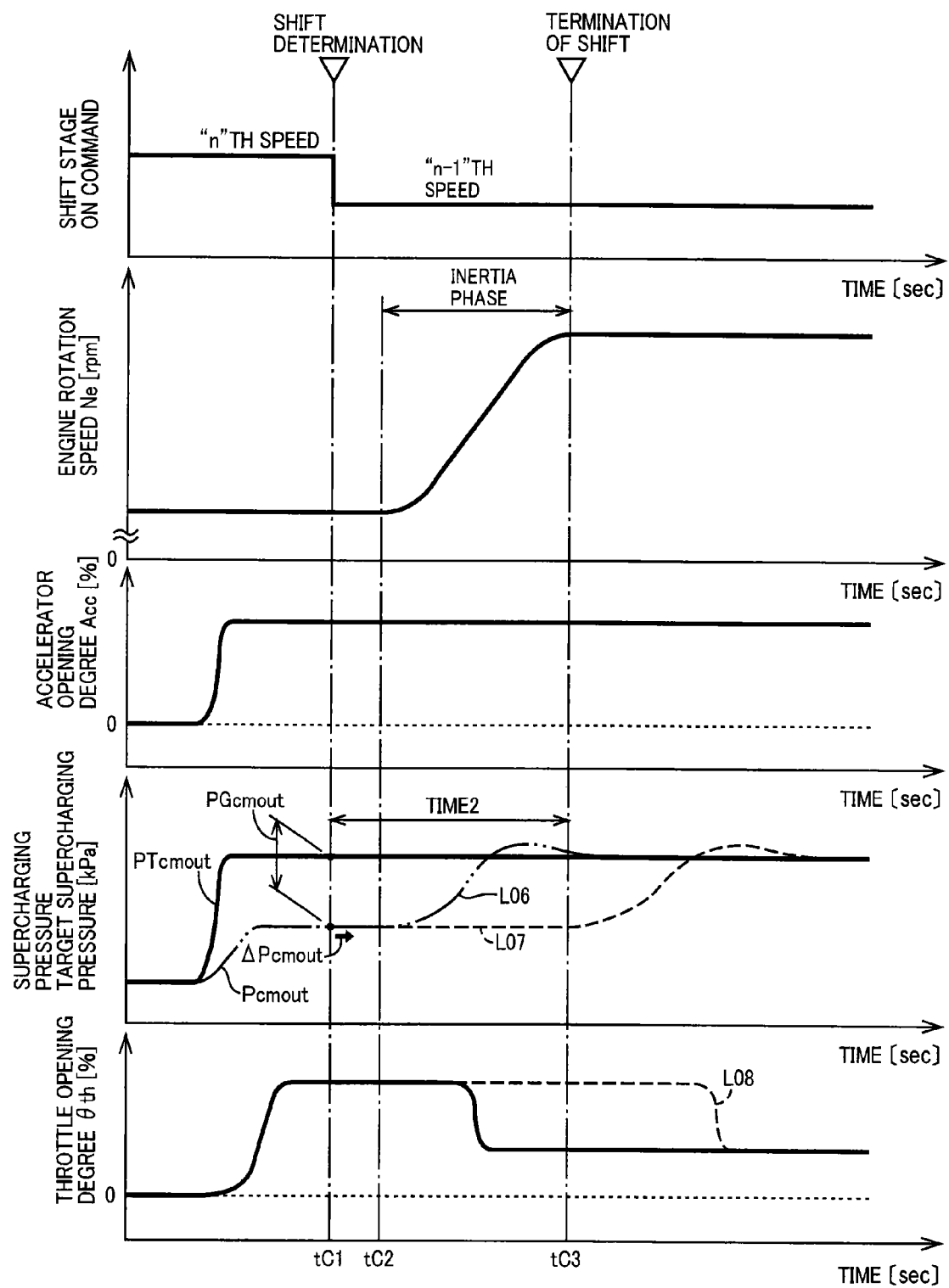
FIG. 9 is a time chart for explaining the flowchart of FIG. 8 in the second example, i.e., a time chart for explaining the second supercharging pressure increase progress suppression control by taking as an example the case of performing the power-on downshift from an "n"th speed to an "n−1"th speed.

FIG. 9 is a time chart for explaining the second supercharging pressure increase progress suppression control by taking as an example the case of performing the power-on downshift from an "n"th speed to an "n–1"th speed. A downshift of the automatic transmission 12 performed in FIG. 9 is the clutch-to-clutch shift such as a shift from the fourth speed to the third speed of the automatic transmission 12, for example. In the time charts of the supercharging pressure Pcmout and the target supercharging pressure PTcmout, a solid line indicates the target supercharging pressure PTcmout and a dashed-two dotted line L06 or a broken line L07 indicates the supercharging pressure Pcmout.

The accelerator opening degree Acc is increased before time tC1 of FIG. 9 and, as a result, the target supercharging pressure PTcmout is raised so as to promptly increase the engine torque Te. Since the supercharging pressure deviation amount PGcmout is enlarged by the raise of the target supercharging pressure PTcmout, the throttle opening degree θth is increased to bring the supercharging pressure Pcmout closer to the target supercharging pressure PTcmout. At time tC1, a shift determination is made for performing a downshift of the automatic transmission 12. Therefore, at time tC1, the determination of SB3 of FIG. 8 is affirmative and the determination of SB4 is made. Both the supercharging pressure deviation amount PGcmout and the supercharging pressure temporal increase rate ΔPcmout compared with the determination values at SB4 are values at time tC1 (at the time of the shift determination), for example, and the determination of SB4 is affirmative in the example of FIG. 9.

Since the determination of SB4 of FIG. 8 is affirmative at time tC1 of FIG. 9, the execution step of the flowchart of FIG. 8 goes to SB5 at time tC1, and the provision of the second supercharging pressure increase progress suppression control is started from time tC1. Time tC2 of FIG. 9 is a time of start of the inertia phase of the downshift and time tC3 is a time of termination of the inertia phase, i.e., a time of termination of the downshift.

In FIG. 9, if the second supercharging pressure increase progress suppression control is not provided, the supercharging pressure Pcmout increases as indicated by the dashed-two dotted line L06 of FIG. 9; however, since the provision of the second supercharging pressure increase progress suppression control is started from time tC1, the progress of the increase in the supercharging pressure Pcmout is suppressed from time tC1 until the second control provision duration time TIME2 elapses. For example, as indicated by the broken line L07 of FIG. 9, the provision of the second supercharging pressure increase progress suppression control retains the supercharging pressure Pcmout at the amplitude of time tC1 from time tC1 to time tC3, and the second supercharging pressure increase progress suppression control is terminated at time tC3 so that the supercharging pressure Pcmout is increased from time tC3. The second supercharging pressure increase progress suppression control may be terminated in conformity with the termination of the downshift, i.e., the supercharging pressure Pcmout may start increasing immediately before time tC3.

Although the supercharging pressure Pcmout normally increases as indicated by the dashed-two dotted line L06 in FIG. 9, the provision of the second supercharging pressure increase progress suppression control suppresses the progress of the supercharging pressure increase as indicated by the broken line L07 and the supercharging pressure Pcmout reaches the target supercharging pressure PTcmout at a time point delayed in association with the suppression of the progress as compared to the dashed-two dotted line L06 and, therefore, the throttle opening degree θth is lowered at a time point delayed as indicated by a broken line L08 as compared to a solid line.

Although the downshift of FIG. 9 is a shift of one stage, the downshift may be a skip shift of two or more stages and, if the downshift is the skip shift, the shift time becomes longer as compared to the shift of one stage and, therefore, the second control provision duration time TIME2 is set longer as compared to the shift of one stage. Therefore, if the progress of the supercharging pressure increase is suppressed when the power-on downshift is performed, i.e., if the second supercharging pressure increase progress suppression control is provided, a period of suppressing the progress of the supercharging pressure increase, i.e., the second control provision duration time TIME2, is made longer when a change width of the shift ratio γat is larger between before and after the downshift.

This example has the following effects (B1) to (B4). (B1) According to this example, if the power-on downshift is performed, the timing adjusting means 216 adjusts the temporal relative relationship between the progress of the supercharging pressure increase in the process of increasing the supercharging pressure Pcmout by the supercharger 54 and the inertia phase start timing of the downshift depending on a supercharging status of the supercharger 54 before start of the inertia phase of the downshift. In particular, in the adjustment of the temporal relative relationship, if the supercharging status before the start of the inertia phase is a status on the initial period side of progress of the supercharging pressure increase, the second supercharging pressure increase progress suppression control is provided to suppress the progress of the supercharging pressure increase as compared to when the adjustment is not performed. Therefore, if the supercharging status before the start of the inertia phase is a status on the initial period side of progress of the supercharging pressure increase, the electronic control device 210 can provide the second supercharging pressure increase progress suppression control to suppress a shift shock that may occur because of overlap between torque variation of the engine 10 due to an increase in the supercharging pressure 12 and a shift operation of the automatic transmission 12. Since the downshift is not delayed for suppressing the shift shock, deterioration in drivability can be avoided that may occur due to a delay of the downshift.

(B2) According to this example, when the power-on downshift is performed, if the progress of the supercharging pressure increase is suppressed, the timing adjusting means 216 cancels the suppression of the progress after termination of the downshift. Therefore, the overlap can be avoided with high certainty between torque variation of the engine 10 due to an increase in the supercharging pressure Pcmout and a shift operation of the automatic transmission 12. Thus, the shift shock is easily suppressed.

(B3) According to this example, whether the progress of the supercharging pressure increase is suppressed by the second supercharging pressure increase progress suppression control is decided based on the supercharging status after the time of the shift determination of the downshift. Therefore, for example, if the accelerator pedal 88 is returned before it is decided that the downshift is performed, unnecessary suppression of the progress of the supercharging pressure increase is avoided.

(B4) According to this example, the second control provision duration time TIME2 is decided based on the running load state at the time of the shift determination of the downshift from the relationship (map) empirically set in advance. Therefore, the second control provision duration time TIME2 can properly be decided with a light control load.

Third Example

Although a vehicle 306 of this example (third example) depicted in FIG. 7 is different from the vehicle 206 of the second example in that an electronic control device 310 is included instead of the electronic control device 210, the vehicle 306 is the same as the vehicle 206 of the second example except this point.

A functional block diagram for explaining a main portion of a control function included in the electronic control device 310 of this example is depicted in FIG. 7 common to the second example. As depicted in FIG. 7, the electronic control device 310 includes the acceleration operation determining means 100 and the downshift determining means 212 as is the case with the electronic control device 210 of the second example. Unlike the second example, the electronic control device 310 functionally includes a supercharging status determining means 314 that is a supercharging status determining portion, and a timing adjusting means 316 that is a timing adjusting portion.

As is the case with the supercharging status determining means 214 of the second example, the supercharging status determining means 314 sequentially detects a progress status of a supercharging pressure increase in an increasing process of the supercharging pressure Pcmout. In short, the supercharging status determining means 314 sequentially detects a supercharging status of the supercharger 54. If the downshift determining means 212 determines that the power-on downshift is performed, the supercharging status determining means 314 determines whether the supercharging status at the time of the shift determination of performing the power-on downshift, i.e., a downshift determination time supercharging status is an ending supercharging status empirically set in advance so as to represent an ending period of supercharging pressure increase in the process of increasing the supercharging pressure Pcmout. For example, in this example, the ending supercharging status is defined as a status of supercharging in which the supercharging pressure deviation amount PGcmout is smaller than an ending supercharging pressure deviation amount determination value PGGcmout empirically set in advance while the supercharging pressure temporal increase rate ΔPcmout is equal to or greater than an ending supercharging pressure temporal increase rate determination value ΔPHcmout empirically set in advance. Therefore, the supercharging status determining means 314 determines that the downshift determination time supercharging status is the ending supercharging status if the supercharging pressure deviation amount PGcmout at the time of the shift determination is smaller than the ending supercharging pressure deviation amount determination value PGGcmout while the supercharging pressure temporal increase rate ΔPcmout at the time of the shift determination is equal to or greater than the ending supercharging pressure temporal increase rate determination value ΔPHcmout. Although the ending supercharging pressure deviation amount determination value PGGcmout may be a value different from the ending supercharging pressure deviation amount determination value PGCcmout of the first example, the ending supercharging pressure deviation amount determination value PGGcmout is set to the same value in this example. Although the ending supercharging pressure temporal increase rate determination value ΔPHcmout may be a value different from the ending supercharging pressure temporal increase rate determination value ΔPDcmout of the first example, the ending supercharging pressure temporal increase rate determination value ΔPHcmout is set to the same value in this example. The ending supercharging pressure deviation amount determination value PGGcmout and the ending supercharging pressure temporal increase rate determination value ΔPHcmout are parameters (determination values) set for the same purpose as the ending supercharging pressure deviation amount determination value PGCcmout and the ending supercharging pressure temporal increase rate determination value ΔPDcmout of the first example. As is the case with the ending supercharging pressure deviation amount determination value PGCcmout and the ending supercharging pressure temporal increase rate determination value ΔPDcmout of the first example, although the ending supercharging pressure deviation amount determination value PGGcmout and the ending supercharging pressure temporal increase rate determination value ΔPHcmout of this example may be constant values, the ending supercharging pressure deviation amount determination value PGGcmout and the ending supercharging pressure temporal increase rate determination value ΔPHcmout are preferably sequentially decided based on the temporal change rate of the accelerator opening degree Acc, the engine rotation speed Ne, and/or the atmospheric pressure Pair at the time of determination (detection) of the supercharging pressure deviation amount PGcmout and the supercharging pressure temporal increase rate ΔPcmout to be compared, for example, at the time of the shift determination. As is the case with the description of the first example, since the range of the initial supercharging status and the range of the ending supercharging status do not overlap with each other when using the supercharging pressure deviation amount PGcmout and the supercharging pressure temporal increase rate ΔPcmout as parameters, for example, the ending supercharging pressure deviation amount determination value PGGcmout is set to the same value as the initial supercharging pressure deviation amount determination value PGEcmout of the second example or to a value smaller than the determination value PGEcmout, and the ending supercharging pressure temporal increase rate determination value ΔPHcmout is set to the same value as the initial supercharging pressure temporal increase rate determination value ΔPFcmout of the second example or to a value larger than the determination value ΔPFcmout. Although the supercharging pressure deviation amount PGcmout and the supercharging pressure temporal increase rate ΔPcmout compared with the determination values PGGcmout and ΔPHcmout are values at the time of the shift determination, the values may be those after the time of the shift determination and before the start of the inertia phase of the downshift and may be, for example, those at the start of the shift for the downshift.

If the power-on downshift is performed, the timing adjusting means 316 adjusts the temporal relative relationship between the progress of the supercharging pressure increase in the process of increasing the supercharging pressure Pcmout by the supercharger 54 and the inertia phase start timing of the downshift depending on a supercharging status of the supercharger 54 before the start of the inertia phase of the downshift. In particular, in the adjustment of the temporal relative relationship, if the supercharging status before the start of the inertia phase is a status on the ending period side of progress of the supercharging pressure increase, a third supercharging pressure increase progress suppression control is provided to suppress the progress of the supercharging pressure increase as compared to when the adjustment is not performed. When the supercharging status before the start of the inertia phase is a status on the ending period side of progress of the supercharging pressure increase, this specifically means that the supercharging status determining means 314 determines that the supercharging status at the time of the shift determination, i.e., the downshift determination time supercharging status, is the ending supercharging status. Also in this example, for the same reason as the second example, if the power-on downshift is performed, the inertia phase start timing is not delayed.

Specifically, in the third supercharging pressure increase progress suppression control, the timing adjusting means 316 suppresses the progress of the supercharging pressure increase from the time of the shift determination of the downshift to the time of termination of the downshift (=the time of termination of the inertia phase) as compared to when the third supercharging pressure increase progress suppression control is not provided. In other words, the timing adjusting means 316 delays the progress of the supercharging pressure increase. If the progress of the supercharging pressure increase is suppressed, the suppression of the progress is canceled in conformity with the termination of the downshift or after the termination of the downshift. In short, the third supercharging pressure increase progress suppression control is terminated in conformity with the termination of the downshift or after the termination of the downshift. In the third supercharging pressure increase progress suppression control, as is the case with the first supercharging pressure increase progress suppression control of the first example, the timing adjusting means 316 adjusts, for example, the waste gate valve opening degree θwg to suppress the progress of the supercharging pressure increase.

For example, as is the case with the timing adjusting means 216 of the second example, the timing adjusting means 316 may sequentially detect the progress status of the downshift from a change in the engine rotation speed Ne to define a time point at which the third supercharging pressure increase progress suppression control is terminated; however, in this example, the timing adjusting means 316 decides a third control provision duration time TIME3 of providing the third supercharging pressure increase progress suppression control such that the third supercharging pressure increase progress suppression control is terminated in conformity with the termination of the downshift or after the termination of the downshift, based on the running load state at the time of the shift determination from a relationship (map) empirically set in advance, for example. The timing adjusting means 316 provides the third supercharging pressure increase progress suppression control from the time of the shift determination until the third control provision duration time TIME3 elapses. In this way, the timing adjusting means 316 terminates the third supercharging pressure increase progress suppression control in conformity with the termination of the downshift or after the termination of the downshift. Although the timing adjusting means 316 of this example adjusts the waste gate valve opening degree θwg to retain the supercharging pressure Pcmout at the time of the shift determination during provision of the third supercharging pressure increase progress suppression control, the timing adjusting means 316 may gradually increase the supercharging pressure Pcmout at a predetermined temporal increase rate to the extent that a shift shock is not enlarged at the downshift.

As compared to the second supercharging pressure increase progress suppression control of the second example, the third supercharging pressure increase progress suppression control of this example is configured with different control contents. For example, it is conceivable that the supercharging pressure temporal increase rates ΔPcmout during provision of the respective controls and/or the control termination time points etc. are different from each other. To take an example of the supercharging pressure temporal increase rates ΔPcmout different between the respective controls, it is conceivable that, while the supercharging pressure Pcmout is gradually increased at a predetermined temporal increase rate in the second supercharging pressure increase progress suppression control, the supercharging pressure Pcmout at the time of the shift determination is retained until the termination of the control in the third supercharging pressure increase progress suppression control of this example. This is because the third supercharging pressure increase progress suppression control is provided in the ending period of the supercharging pressure increase while the second supercharging pressure increase progress suppression control is provided in the initial period of the supercharging pressure increase and, therefore, it is conceivable that the supercharging pressure Pcmout at the start of provision of the third supercharging pressure increase progress suppression control is closer to the target supercharging pressure PTcmout as compared to the start of provision of the second supercharging pressure increase progress suppression control.

Figure 10:
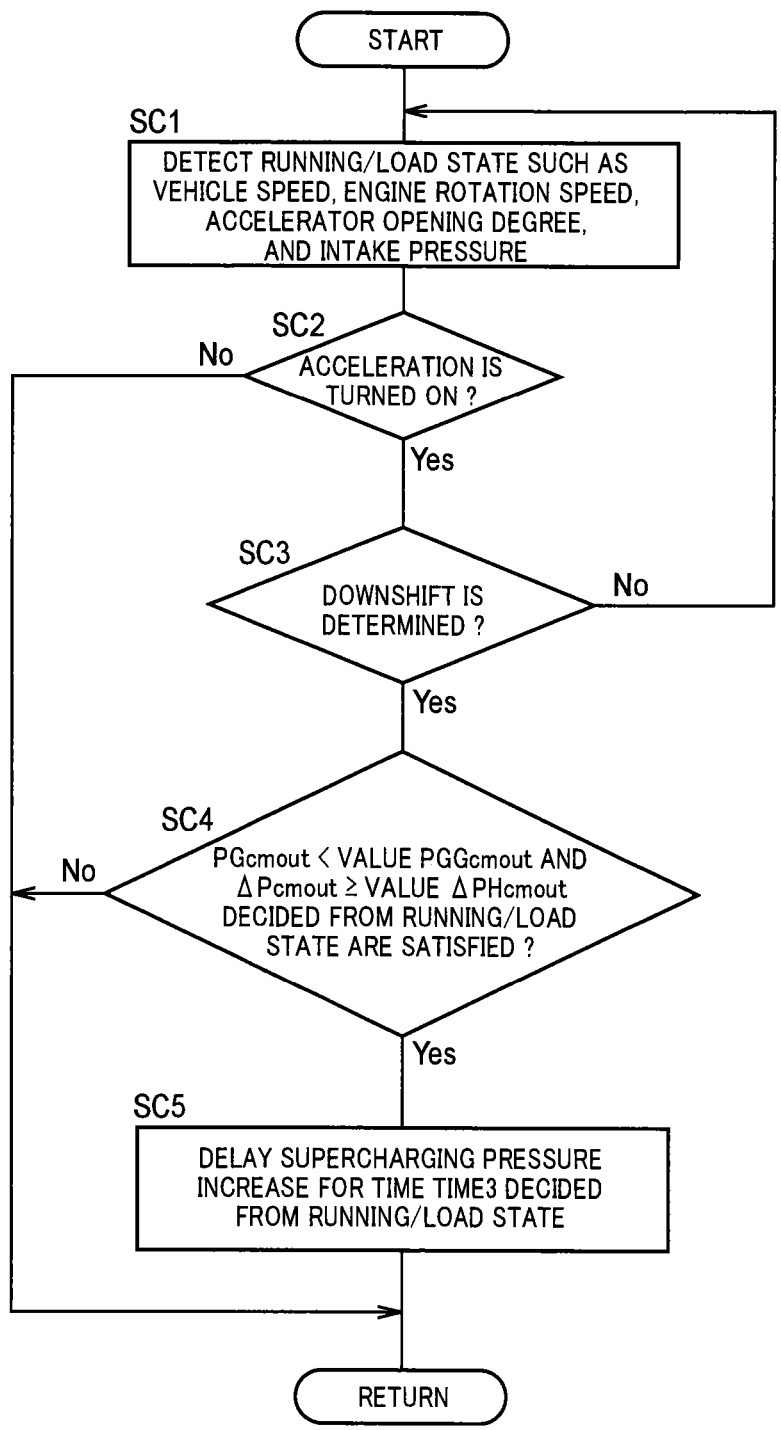
FIG. 10 is a flowchart of the third example for explaining a main portion of the control operation of the electronic control device of FIG. 7, i.e., a flowchart for explaining a control operation of providing third supercharging pressure increase progress suppression control when a power-on downshift is performed.

FIG. 10 is a flowchart for explaining a main portion of a control operation of the electronic control device 310, i.e., a control operation of providing the third supercharging pressure increase progress suppression control when the power-on downshift is performed, and is repeatedly executed with an extremely short cycle time, for example, on the order of a few msec to a few tens of msec. The control operation depicted in FIG. 10 is performed solely or concurrently with another control operation. SC1 to SC3 of FIG. 10 are the same as SB1 to SB3, respectively, of FIG. 8 and, therefore, SC1 to SC3 will not be described.

In FIG. 10, if the determination of SC3 is affirmative, the operation goes to SC4. At SC4 corresponding to the supercharging status determining means 314, it is determined whether the supercharging pressure deviation amount PGcmout at the time of the shift determination is smaller than the ending supercharging pressure deviation amount determination value PGGcmout while the supercharging pressure temporal increase rate ΔPcmout at the time of the shift determination is equal to or greater than the ending supercharging pressure temporal increase rate determination value ΔPHcmout. If the determination of SC4 is affirmative, i.e., if the supercharging pressure deviation amount PGcmout at the time of the shift determination is smaller than the ending supercharging pressure deviation amount determination value PGGcmout while the supercharging pressure temporal increase rate ΔPcmout at the time of the shift determination is equal to or greater than the ending supercharging pressure temporal increase rate determination value ΔPHcmout, the operation goes to SC5. On the other hand, if the determination of SC4 is negative, this flowchart is terminated.

At SC5 corresponding to the timing adjusting means 316, the third supercharging pressure increase progress suppression control is provided. Specifically, in the third supercharging pressure increase progress suppression control, the progress of the supercharging pressure increase is suppressed for the third control provision duration time TIME3 decided based on the running load state. For example, a supercharging pressure increase is delayed for the third control provision duration time TIME3.

Figure 11:
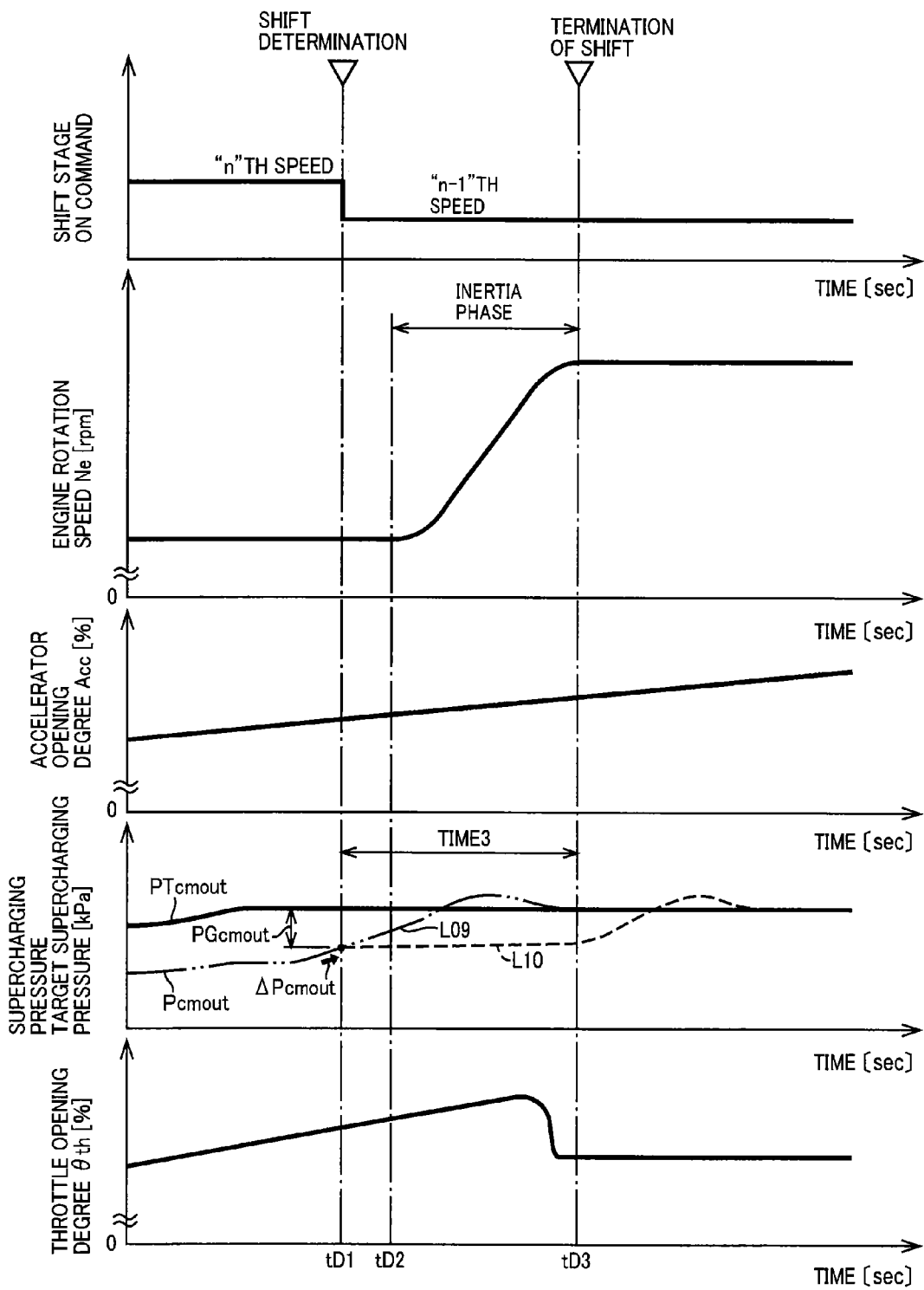
FIG. 11 is a time chart for explaining the flowchart of FIG. 10 in the third example, i.e., a time chart for explaining the third supercharging pressure increase progress suppression control by taking as an example the case of performing the same power-on downshift as the time chart of FIG. 9.

FIG. 11 is a time chart for explaining the third supercharging pressure increase progress suppression control by taking as an example the case of performing the same power-on downshift as the time chart of FIG. 9. In the time charts of the supercharging pressure Pcmout and the target supercharging pressure PTcmout, a solid line indicates the target supercharging pressure PTcmout and a dashed-two dotted line L09 or a broken line L10 indicates the supercharging pressure Pcmout.

The accelerator opening degree Acc is increased from before time tD1 of FIG. 11 and, as a result, the target supercharging pressure PTcmout is raised so as to promptly increase the engine torque Te. Since the supercharging pressure deviation amount PGcmout is enlarged by the raise of the target supercharging pressure PTcmout, the throttle opening degree θth is increased to bring the supercharging pressure Pcmout closer to the target supercharging pressure PTcmout. At time tD1, a shift determination is made for performing a downshift of the automatic transmission 12. Therefore, at time tD1, the determination of SC3 of FIG. 10 is affirmative and the determination of SC4 is made. Both the supercharging pressure deviation amount PGcmout and the supercharging pressure temporal increase rate ΔPcmout compared with the determination values at SC4 are values at time tD1 (at the time of the shift determination), for example, and the determination of SC4 is affirmative in the example of FIG. 11.

Since the determination of SC4 of FIG. 10 is affirmative at time tD1 of FIG. 11, the execution step of the flowchart of FIG. 10 goes to SC5 at time tD1, and the provision of the third supercharging pressure increase progress suppression control is started from time tD1. Time tD2 of FIG. 11 is a time of start of the inertia phase of the downshift and time tD3 is a time of termination of the inertia phase, i.e., a time of termination of the downshift.

In FIG. 11, if the third supercharging pressure increase progress suppression control is not provided, the supercharging pressure Pcmout increases as indicated by the dashed-two dotted line L09 of FIG. 11; however, since the provision of the third supercharging pressure increase progress suppression control is started from time tD1, the progress of the increase in the supercharging pressure Pcmout is suppressed from time tD1 until the third control provision duration time TIME3 elapses. For example, as indicated by the broken line L10 of FIG. 11, the provision of the third supercharging pressure increase progress suppression control retains the supercharging pressure Pcmout at the amplitude of time tD1 from time tD1 to time tD3, and the third supercharging pressure increase progress suppression control is terminated at time tD3 so that the supercharging pressure Pcmout is increased from time tD3. The third supercharging pressure increase progress suppression control may be terminated in conformity with the termination of the downshift, i.e., the supercharging pressure Pcmout may start increasing immediately before time tD3.

Although the downshift of FIG. 11 is a shift of one stage, the downshift may be a skip shift of two or more stages and, if the downshift is the skip shift, the shift time becomes longer as compared to the shift of one stage and, therefore, the third control provision duration time TIME3 is set longer as compared to the shift of one stage. Therefore, if the progress of the supercharging pressure increase is suppressed when the power-on downshift is performed, i.e., if the third supercharging pressure increase progress suppression control is provided, a period of suppressing the progress of the supercharging pressure increase, i.e., the third control provision duration time TIME3, is made longer when a change width of the shift ratio γat is larger between before and after the downshift.

This example has the following effects (C1) and (C2) in addition to the effects (B2) and (B3) of the second example as described above. (C1) According to this example, if the power-on downshift is performed, the timing adjusting means 316 adjusts the temporal relative relationship between the progress of the supercharging pressure increase in the process of increasing the supercharging pressure Pcmout by the supercharger 54 and the inertia phase start timing of the downshift depending on a supercharging status of the supercharger 54 before start of the inertia phase of the downshift. In particular, in the adjustment of the temporal relative relationship, if the supercharging status before the start of the inertia phase is a status on the ending period side of progress of the supercharging pressure increase, the third supercharging pressure increase progress suppression control is provided to suppress the progress of the supercharging pressure increase as compared to when the adjustment is not performed. Therefore, if the supercharging status before the start of the inertia phase is a status on the ending period side of progress of the supercharging pressure increase, the electronic control device 310 can provide the third supercharging pressure increase progress suppression control to suppress a shift shock that may occur because of overlap between torque variation of the engine 10 due to an increase in the supercharging pressure Pcmout and a shift operation of the automatic transmission 12. Since the downshift is not delayed for suppressing the shift shock, deterioration in drivability can be avoided that may occur due to a delay of the downshift.

(C2) According to this example, the third control provision duration time TIME3 is decided based on the running load state at the time of the shift determination of the downshift from the relationship (map) empirically set in advance. Therefore, the third control provision duration time TIME3 can properly be decided with a light control load.

Although the examples of the present invention have been described in detail with reference to the drawings, these are merely an embodiment and the present invention can be implemented in variously modified and improved forms based on the knowledge of those skilled in the art.

For example, although the supercharging status determining means 104 determines whether the upshift determination time supercharging status is the initial supercharging status before determining whether the upshift determination time supercharging status is the ending supercharging status in the first example, the order of determination may be reversed.

Although SA6 and SA7 are included in the flowchart of FIG. 4 in the first example, SA6 and SA7 may not be included and, if the determination of SA4 is negative, the flowchart of FIG. 4 may be terminated. Alternatively, SA4 and SA5 may not be included in the flowchart of FIG. 4 and, if the determination of SA3 is affirmative, the operation may go to SA6 in the flowchart.

Although the inertia phase of the upshift is started after end of the increase in the supercharging pressure Pcmout in the upshift delay control in the first example, the inertia phase of the upshift may be started before end of the increase in the supercharging pressure Pcmout to the extent that a shift shock is not enlarged.

Although if the progress of the supercharging pressure increase is suppressed by providing the first supercharging pressure increase progress suppression control, the suppression of the progress is canceled after termination of the upshift in the first example, the suppression may be canceled before termination of the upshift to the extent that a shift shock is not enlarged. The same applies to the provision of the second supercharging pressure increase progress suppression control or the third supercharging pressure increase progress suppression control.

Although the time charts of FIGS. 5, 6, 9, and 11 represent examples that the automatic transmission 12 performs the clutch-to-clutch shift in the first to third examples, it is not essential that the shift of the automatic transmission 12 is the clutch-to-clutch shift.

Although the vehicles 6, 206, and 306 do not include an electric motor as a drive force source for running in the first to third examples, the vehicles may be hybrid vehicles including an electric motor for running.

Although the vehicles 6, 206, and 306 include the torque converter 14 as depicted in FIG. 1 in the first to third examples, the torque converter 14 is not essential.

Although the supercharger 54 is an exhaust turbine supercharger in the first to third examples, the supercharger 54 may be a mechanical type supercharger, i.e., mechanical supercharger, rotationally driven by rotation of the output shaft 13 of the engine 10. If the supercharger 54 is a mechanical supercharger, the exhaust bypass path 66 and the waste gate valve 68 are not disposed, while a clutch is disposed that selectively couples the output shaft 13 of the engine 10 and a rotation shaft of the mechanical supercharger.

Although the determination is made on both the supercharging pressure deviation amount PGcmout and the supercharging pressure temporal increase rate ΔPcmout at SA4 in FIG. 4 of the first example, the determination may be made on only one of them. The same applies to SA6 of FIG. 4, SB4 of FIG. 8, and SC4 of FIG. 10.

Although the determination is made from the supercharging pressure deviation amount PGcmout and the supercharging pressure temporal increase rate ΔPcmout on whether the progress status of the supercharging pressure increase in the increasing process of the supercharging pressure Pcmout is a status of the initial period in the increasing process or a status of the ending period in the increasing process in the first to third examples, the determination may be made from another index value such as an elapsed time from a predetermined reference time, for example.

Although the predetermined timing of the present invention corresponds to the time of termination of the upshift in the first to third examples, the predetermined timing is not limited to the time of termination of the upshift and may be a time point near the termination of the upshift and may correspond to, for example, a time point shifted by a predetermined time before or after the termination of the upshift.

A plurality of the examples described above may be implemented in a mutually combined manner by setting priorities, for example. For example, if the second and third examples are combined with each other, the combined control operation is as depicted in a flowchart of FIG. 12. In the case of the flowchart depicted in FIG. 12, if the power-on downshift is performed, the electronic control device executing the flowchart provides the second supercharging pressure increase progress suppression control or the third supercharging pressure increase progress suppression control to suppress the progress of the supercharging pressure increase from before the start of the inertial phase of the downshift. Specifically, if the supercharging status before the start of the inertia phase is a status on the initial period side of progress of the supercharging pressure increase, the second supercharging pressure increase progress suppression control is provided, while if the supercharging status before the start of the inertia phase is a status on the ending period side of progress of the supercharging pressure increase, the third supercharging pressure increase progress suppression control is provided. Therefore, the electronic control device switches the contents of control of suppressing the progress of the supercharging pressure increase depending on a supercharging status before the start of the inertia phase, or in other words, depending on a progress status of the supercharging pressure increase before the start of the inertia phase. As a result, the progress of the supercharging pressure increase can be suppressed without excess or shortage so as to restrain the shift shock regardless of whether the supercharging status is a status on the initial period side of progress or a status on the ending period side of progress of the supercharging pressure increase.

NOMENCLATURE OF ELEMENTS 6, 206, 306: vehicle 7: vehicle drive device 10: engine 12: automatic transmission 38: drive wheels 52, 210, 310: electronic control device (control device) 54: supercharger

The invention claimed is:

1. A control device of a vehicle drive device including an engine having a supercharger and an automatic transmission outputting power of the engine to drive wheels
   when an upshift of the automatic transmission is performed by executing an acceleration operation, if a progress status of a supercharging pressure increase in a supercharger pressure increasing process by the supercharger is a status in an initial period of the increasing process, a supercharging pressure increase degree before start of an inertia phase of the upshift being made smaller than a supercharging pressure increase degree after a predetermined timing subsequent to the start of the inertia phase, while if the progress status of the supercharging pressure increase is a status in an ending period of the increasing process, the supercharging pressure increase degree before the start of the inertia phase being made larger than the supercharging pressure increase degree after the predetermined timing.

2. The control device of a vehicle drive device of claim 1, wherein
   if the progress status of the supercharging pressure increase is a status in the ending period of the increasing process, the inertia phase of the upshift is started after end of the supercharging pressure increase.

3. The control device of a vehicle drive device of claim 1, wherein
   the predetermined timing is a time of termination of the upshift, wherein
   if the progress status of the supercharging pressure increase is a status in the initial period of the increasing process, the supercharging pressure increase degree before the predetermined timing is made smaller than the supercharging pressure increase degree after the predetermined timing.

4. The control device of a vehicle drive device of claim 1, wherein
   the supercharging pressure is increased toward a predefined supercharging pressure target value, and wherein
   a case when the progress status of the supercharging pressure increase is a status in the initial period of the increasing process, is a case when a deviation amount of the supercharging pressure from the supercharging pressure target value is larger while the supercharging pressure increase degree is smaller, as compared to when the progress status of the supercharging pressure increase is a status in the ending period of the increasing process.

5. The control device of a vehicle drive device of claim 1, wherein
   when a downshift of the automatic transmission is performed by executing the acceleration operation, progress of the supercharging pressure increase is suppressed from before start of an inertia phase of the downshift, and wherein
   contents of control of suppressing the progress of the supercharging pressure increase are switched depending on a progress status of a supercharging pressure increase before the start of the inertia phase.

6. The control device of a vehicle drive device of claim 5, wherein
   when a downshift of the automatic transmission is performed by executing the acceleration operation, and progress of the supercharging pressure increase is suppressed, suppression of the progress is cancelled after termination of the downshift.

* * * * *